US010243848B2

(12) United States Patent
Agarwal et al.

(10) Patent No.: US 10,243,848 B2
(45) Date of Patent: Mar. 26, 2019

(54) PROVISIONING LOGICAL ENTITIES IN A MULTI-DATACENTER ENVIRONMENT

(71) Applicant: Nicira, Inc., Palo Alto, CA (US)

(72) Inventors: Vivek Agarwal, Campbell, CA (US); Ganesan Chandrashekhar, Campbell, CA (US); Abhishek Goliya, Pune (IN); Akshay Katrekar, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 570 days.

(21) Appl. No.: 14/838,122

(22) Filed: Aug. 27, 2015

(65) Prior Publication Data

US 2016/0380815 A1    Dec. 29, 2016

(30) Foreign Application Priority Data

Jun. 27, 2015 (IN) .......................... 3254/CHE/2015

(51) Int. Cl.
*H04L 12/24* (2006.01)
*H04L 29/08* (2006.01)
(Continued)

(52) U.S. Cl.
CPC .......... *H04L 45/66* (2013.01); *G06F 9/45558* (2013.01); *H04L 41/0806* (2013.01); *H04L 45/586* (2013.01); *H04L 45/60* (2013.01); *H04L 49/15* (2013.01); *H04L 49/25* (2013.01); *H04L 49/35* (2013.01); *H04L 49/70* (2013.01); *H04L 69/324* (2013.01); *H04L 69/325* (2013.01); *G06F 2009/45595* (2013.01)

(58) Field of Classification Search
CPC ..... H04L 45/44; H04L 45/586; H04L 61/103; H04L 12/462; H04L 45/64; H04L 12/4625; H04L 12/4633; H04L 12/66; H04L 41/0893; H04L 45/122
USPC ......................................................... 709/220
See application file for complete search history.

(56) References Cited

U.S. PATENT DOCUMENTS 9,825,851 B2      11/2017   Agarwal et al.
2013/0044636 A1*   2/2013   Koponen ................ H04L 47/12
                                                             370/254

(Continued)

FOREIGN PATENT DOCUMENTS

WO    2013152716 A1    10/2013
WO    2015054671 A2     4/2015
WO    2017003881 A1     1/2017

OTHER PUBLICATIONS

International Search Report and Written Opinion of commonly owned International Patent Application PCT/US2016/039426, dated Nov. 10, 2016, 12 pages, International Searching Authority.

(Continued)

*Primary Examiner* — Oleg Survillo
*Assistant Examiner* — Imran Moorad
(74) *Attorney, Agent, or Firm* — Adeli LLP

(57) ABSTRACT

A system provisions global logical entities that facilitate the operation of logical networks that span two or more datacenters. These global logical entities include global logical switches that provide L2 switching as well as global routers that provide L3 routing among network nodes in multiple datacenters. The global logical entities operate along side local logical entities that are for operating logical networks that are local within a datacenter.

21 Claims, 21 Drawing Sheets

(51) Int. Cl.
*H04L 12/721* (2013.01)
*H04L 12/773* (2013.01)
*H04L 12/933* (2013.01)
*H04L 12/947* (2013.01)
*H04L 12/713* (2013.01)
*G06F 9/455* (2018.01)
*H04L 12/931* (2013.01)

(56) References Cited

U.S. PATENT DOCUMENTS

| | | |
|---|---|---|
| 2013/0044641 A1* | 2/2013 | Koponen .............. H04L 12/66 370/255 |
| 2013/0044761 A1 | 2/2013 | Koponen et al. |
| 2013/0058250 A1* | 3/2013 | Casado ............. H04L 12/4633 370/254 |
| 2014/0146817 A1 | 5/2014 | Zhang |
| 2014/0301391 A1 | 10/2014 | Krishnan et al. |
| 2015/0016276 A1* | 1/2015 | DeCusatis ........... H04L 49/9057 370/242 |
| 2015/0100704 A1* | 4/2015 | Davie .................... H04L 45/16 709/238 |
| 2015/0103843 A1 | 4/2015 | Chandrashekhar et al. |
| 2015/0106804 A1 | 4/2015 | Chandrashekhar et al. |
| 2016/0134528 A1* | 5/2016 | Lin ........................ H04L 45/66 709/238 |
| 2016/0380891 A1 | 12/2016 | Agarwal et al. |
| 2016/0380925 A1 | 12/2016 | Agarwal et al. |

OTHER PUBLICATIONS

Mahalingham, Mallik, et al., "VXLAN: A Framework for Overlaying Virtualized Layer 2 Networks over Layer 3 Networks," Internet Draft, Aug. 26, 2011, 20 pages, Internet Engineering Task Force.

\* cited by examiner

| | destination IP | source IP | source MAC | Next Hop MAC | Next Hop VNI |
|---|---|---|---|---|---|
| 1061 | ... | | | | ... |
| Site A routes | 36.23.15.154 | 192.168.3.10 | MAC1 | MAC12 | 200 |
| | 36.23.15.154 | 192.168.3.10 | MAC12 | MAC96 | 6000 |
| | ... | | | | ... |
| 1062 | | | | | |
| Site B routes | 36.23.15.154 | 192.168.2.1 | MAC111 | MAC112 | 200 |
| | 36.23.15.154 | 192.168.2.1 | MAC112 | MAC196 | 7000 |
| | ... | | | | ... |

PROVISIONING LOGICAL ENTITIES IN A MULTI-DATACENTER ENVIRONMENT

BACKGROUND

A logical router element (LRE) is a network logical entity operates distributively across different host machines of a datacenter as a L3 virtual distributed router (VDR). A logical switch element (LSE) is a network logical entity that operates distributively across different host machines of a datacenter as a L2 switch. Each host machine operates its own local instance of the LRE as a managed physical routing element (MPRE) for performing L3 packet forwarding for the VMs running on that host. Each host machine also operates its own local instance of the LSE as a managed physical switching element (MPSE) for performing L2 packet forwarding for VMs running on the host. LSEs and LREs therefore make it possible to forward data packets locally (i.e., at the originating hypervisor) without going through a shared physical L3 router or L2 switch.

SUMMARY

Some embodiments of the invention provide global logical entities that, once provisioned, facilitate the operation of logical networks that span two or more datacenters. In some embodiments, these global logical entities include global logical switches that provide L2 switching as well as global routers that provide L3 routing among network nodes in multiple datacenters. In some embodiments, the global logical entities operate along side local logical entities that are for operating logical networks that are local within a datacenter.

A local logical network is local to a datacenter and all of its network nodes are computing and/or network resources located within the local datacenter. All traffic of a local logical network is confined within the datacenter. A global logical network may spans two or more datacenters and its network nodes may be located in several different datacenters. The traffic of a global logical network may flow between different datacenters as well as locally within a datacenter. In some embodiments, the traffic of a local logical network is conducted by local logical switches and routers that are confined to the datacenter, while the traffic of a global logical network is conducted by global logical switches and routers that can span two or more datacenters.

A datacenter has computing devices that serve as host machines of VMs. In some embodiments, these host machines also operate the logical entities of logical networks such as (global/local) logical routers and logical switches. In some embodiments, logical entities such as logical switches are each assigned an identifier, and that the identifier of a logical entity is recognized across different host machines that implement the logical entity. Each host machine may implement multiple different logical entities for multiple different logical networks, and the identifier of these different logical entities are used to identify each logical entity.

A control cluster is a collection of machines that control the operations of host machines in a datacenter. By controlling the host machines of a datacenter, the control cluster also controls the operations of the physical switching elements, the physical routing elements, and other elements operating in each of the host machines. As physical switching elements and physical routing elements across different host machines jointly implement logical switches and routers for various logical networks, the control cluster also controls the operations of those logical networks by controlling their logical switches and routers. In some embodiments, a global control cluster (GCC) controls the operations of global logical entities across multiple datacenters, while local control clusters (LCCs) control the operations of local logical entities. In some embodiments, a global control cluster controls the global logical entities by control plane messages to the host machines that implement the global entities, while a local control cluster controls the local logical entities by control plane messages to the host machines that implement the local logical entities. In some embodiments, a global control cluster controls all logical entities across all participating sites, regardless of whether those logical entities are global logical entities or local logical entities.

In some embodiments, a control cluster collect information learned by host machines or physical routers during the operations of the logical network. The control cluster in turn generates and distributes routing instructions such as routing table entries to the various host machines implementing the logical network. In order to implement logical networks that span multiple datacenters, the global control cluster collects and distributes routing information across the multiple datacenters. Some embodiments associate the collected routing information with locale identifiers. A locale identifier is for identifying a datacenter.

In some embodiments, a locale identifier is for identifying a particular routing path or a forwarding hop as being in a particular datacenter. In some embodiments, a locale identifier is for identifying a set of routing information as being collected at a particular datacenter. In some embodiments, the global control cluster uses locale identifiers associated with routing information to determine where the available routing resources are and to plan routing paths. In some embodiments, the global control cluster distributes routing information to host machines, the distributed routing information being associated with locale identifiers such that the receiving host machines would be able to determine the locale (i.e., the site or the datacenter) of routing paths or forwarding hops and so to be able to forward packets accordingly.

In some embodiments, the routing information collected and reported by a datacenters includes routing information that are learned by edge routers or gateways of the datacenter. In some embodiments, the edge routers or gateways learns the information from the external world (e.g., Internet) though protocols such as Boarder Gateway Protocol (BGP) for exchanging routing and reachability information. Since a global logical entity spans multiple datacenters, a global control cluster controlling the global logical entity would receive multiple reports of such learned edge routing information from multiple different edge routers in multiple different datacenters. In some embodiments, each of such reports is associated with the locale identifier of the reporting datacenter so that the global control cluster can distinguish different sets of routing information from different datacenters.

In some embodiments, when a particular datacenter does not have edge routing information of its own, the global control cluster would distribute edge routing information from other datacenters to the particular datacenter. In some embodiments, one of the datacenters with local egress is designated as the default site, whose edge routing information is distributed to the particular datacenter without its own local egress to the external network.

In some embodiments, network managers of datacenters provision logical entities such as logical routers and logical switches. A network manager of a datacenter, upon receiving specification of logical network entities (logical switches, logical routers), generates a set of configuration data for configuring the host machines of the datacenter for the purpose of implementing the logical network entities. In the case of global logical entities that spans multiple datacenters in a multi-site environment, in some embodiments, one of the datacenters is designated or configured as the primary datacenter or primary site. The network manager of the primary site is responsible for providing the specification for the global logical entities to all datacenters in the multi-site environment. Each network manager of a datacenter (primary or secondary site) in turn uses the specification to generate configuration data for configuring the computing devices of its site to implement the global logical entities. The generated configuration data is also provided to the global control cluster so the global control cluster can control the global logical entities in each of the sites. This ensures that the provisioning and configuration of global logical entities is uniformly specified and synchronized.

In some embodiments, when the primary site's network manager sends (replicates) specification of global logical entities to the secondary sites' network managers, the primary site's network manager sends the specification as a series of transactions, each transaction is associated with a transaction identifier. In some embodiments, each transaction is associated with a global logical entity (i.e., for delivering the configuration data of a particular global logical router or switch). After the specification has been transmitted, the receiving secondary site's network manager uses the transaction IDs to report to the primary site's network manager as to which configuration transactions were successfully completed. The primary site's network manager in turn uses the reported transaction IDs to identify the transaction that have failed so it can re-transmit those failed transactions.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide global logical entities that, once provisioned, facilitate the operation of logical networks that span two or more datacenters. In some embodiments, these global logical entities include global logical switches that provide L2 switching as well as global routers that provide L3 routing among network nodes in multiple datacenters. In some embodiments, the global logical entities operate along side local logical entities that are for operating logical networks that are local within a datacenter.

Figure 1:
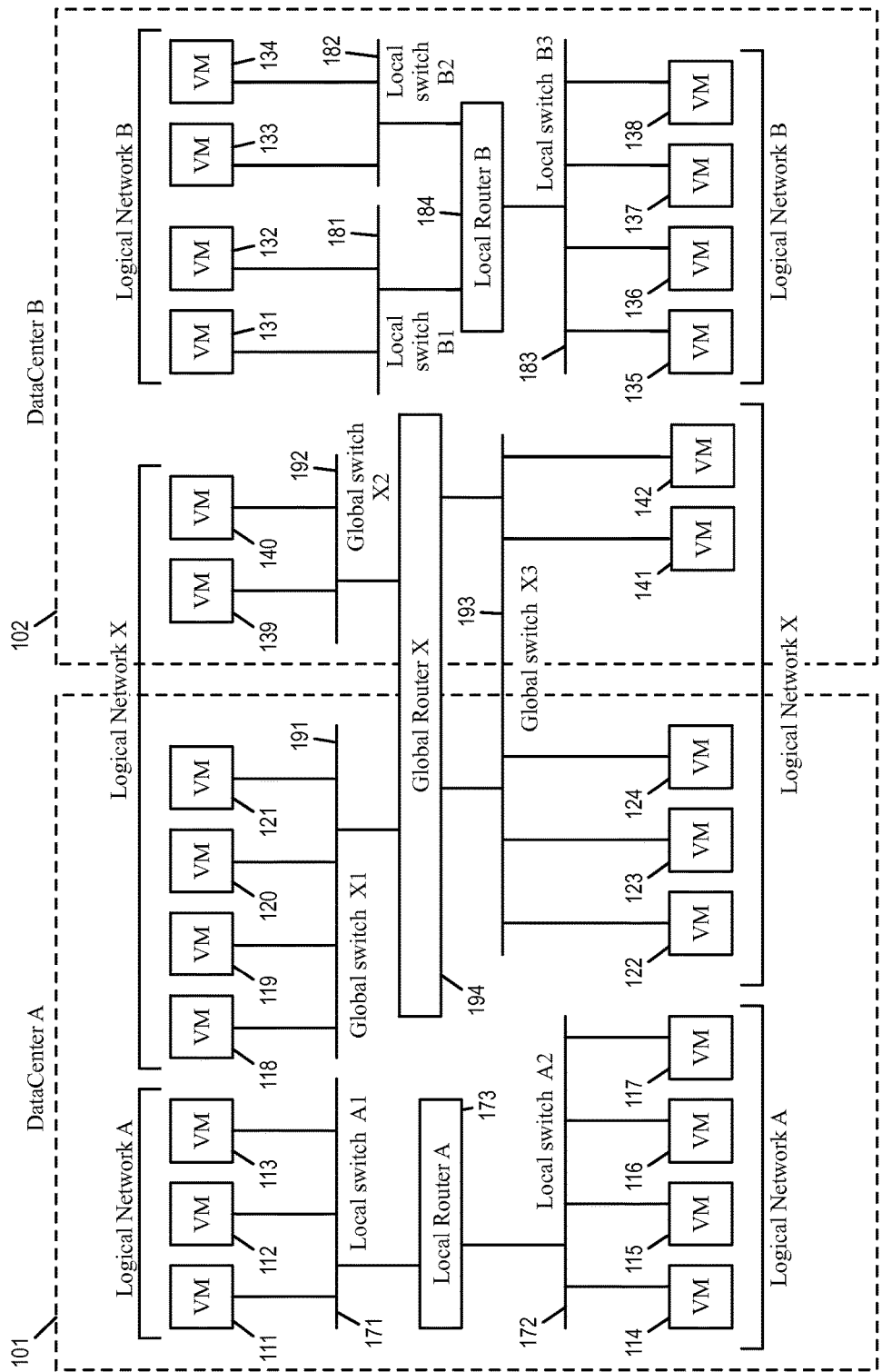
FIG. 1 illustrates a multi-site environment in which global logical networks span multiple datacenters.

For some embodiments, FIG. 1 illustrates a multi-site environment 100 in which global logical networks span multiple datacenters (multiple physical sites). The figure illustrates two datacenters 101 and 102 (datacenter A and datacenter B). A datacenter such as the datacenter 101 or 102 provides computing and/or networking resources to tenants or clients. The computing and/or network resources are logically organized into logical networks for different tenants, where the computing and networking resources are accessible or controllable as network nodes of these logical networks.

The figure illustrates several logical networks (A, B, and X) operating in datacenters 101 and 102. Some of these logical networks are local logical networks, while others are global logical networks. The logical network A is a local logical network that operates locally within datacenter 101. The logical network B is a local logical network that operates locally within datacenter 102. The logical network X is a global logical network that operates in both datacenters 101 and 102. A local logical network is local to a datacenter and all of its network nodes are computing and/or network resources located within the local datacenter. All traffic of a local logical network is confined within the datacenter. A global logical network may spans two or more datacenters and its network nodes may be located in several different datacenters. The traffic of a global logical network may flow between different datacenters as well as locally within a datacenter.

As illustrated, the datacenter 101 provides network nodes 111-124 as computing/networking resources for its tenants, while the datacenter 102 provides network nodes 131-142 as computing computing/networking resources for its tenants. In some embodiments, some of these computing and networking resources are operating on a virtualized platform, wherein virtual machines (VMs) hosted by computing devices (host machines) running virtualization software serve as the computing and network resources. Consequently, each network node in the example of FIG. 1 is labeled as "VM", though in some embodiments, some of the computing/network resources are physical, rather than virtual, machines.

The VMs (or network nodes) 111-117 of the datacenter 101 belong to the logical network A, which is a local logical network of the datacenter 101. The VMs 131-138 of the datacenter 102 belong to the logical network B, which is a local logical network of the datacenter 102. The VMs 118-124 of the datacenter 101 as well as the VMs 139-142 of the datacenter 102 belong to the global logical network X, which spans both datacenters 101 and 102.

In some embodiments, the traffic of a local logical network is conducted by local logical switches and routers that are confined to the datacenter, while the traffic of a global logical network is conducted by global logical switches and routers that can span two or more datacenters.

As illustrated, the local logical network A of datacenter A includes local logical switches (LLSs) A1 and A2 as well as a local logical router (LLR) A. The LLS A1 (171) is for conducting L2 (data-link layer) traffic between VMs 111-113, the LLS A2 (172) is for conducting L2 traffic between the VMs 114-117, while the LLR A3 (173) is for conducting L3 (network layer) traffic between LLSs A1 and A2 (i.e., between the VMs attached to logical switches A1 and A2). All logical entities of logical network A are local logical entities of datacenter A and are confined to datacenter A, and the network traffic conducted by those logical entities are confined to traffic between VMs of the datacenter A.

The local logical network B of datacenter B includes LLSs B1, B2, and B3 as well as a LLR B. The LLS B1 (181) is for conducting L2 (data-link layer) traffic between VMs 131-132, the LLS B2 (182) is for conducting L2 traffic between the VMs 133-134, the LLS B3 (183) is for conducting L2 traffic between VMs 135-138, while the LLR B4 (184) is for conducting L3 traffic among LLS B1, B2, and B3 (i.e., among the VMs attached to logical switches B1, B2, and B3). All logical entities of logical network B are local logical entities of datacenter B and are confined to datacenter B, and the network traffic conducted by those logical entities are confined to traffic between VMs of the datacenter B.

On the other hand, the global logical network X includes global logical switches (GLSs) X1, X2, and X3 as well as a global logical router (GLR) GLR X4. The GLS X1 (191) is for conducting L2 (data-link layer) traffic between VMs 118-121, the GLS X2 (192) is for conducting L2 traffic between the VMs 139-140, the GLS X3 (193) is for conducting L2 traffic between VMs 122-124 and 141-142, while the GLR X4 (194) is for conducting L3 traffic among LLS X1, X2, and X3 (i.e., among the VMs attached to logical switches X1, X2, and X3). As illustrated, a global logical entity (such as the GLR 194 and the GLS 193) can span multiple datacenters, and the network traffic (data packets, etc.) being handle by those global logical entities can travel from one datacenter to another (i.e., between datacenters A and B). In some embodiments, not all logical entities of a global logical network span multiple datacenters. For example, the global logical switch X2 (192) only has VMs in datacenter B, while the global logical switch X1 (191) only has VMs in datacenter A.

In some embodiments, even when a global logical switch serves only VMs in one datacenter (e.g., GLSs X1 and X2), its configuration still spans globally across all datacenters of the multisite environment. However, in some embodiments, the configuration of a GLS would only be activated in data paths that have VMs connected to the GLS. In other words, the configuration of GLS X1 is active only at host machines of VMs 118-121 (which are all in datacenter A), and the configuration GLS X2 is active only at host machines of VMs 139-140 (which are all in datacenter B).

In some embodiments, different logical networks may belong to different tenants. A tenant with VMs in only one datacenter can configure its network to be a local logical network with logical entities that are all local to the datacenter. Conversely, a tenant with VMs in multiple different datacenters can configure its network to be a global logical network, whose routers and switches can span multiple datacenters. In some embodiments, one tenant may simultaneously own multiple logical networks, whether local or global. In some embodiments, network traffic between the different logical networks are be handled by routers that are mutually accessible to the different logical networks.

As mentioned, a datacenter has computing devices that serve as host machines of VMs. In some embodiments, these host machines also operate the logical entities of logical networks such as (global/local) logical routers and logical switches. In some embodiments, logical entities such as logical switches are each assigned an identifier, and that the identifier of a logical entity is recognized across different host machines that implement the logical entity. Each host machine may implement multiple different logical entities for multiple different logical networks, and the identifier of these different logical entities are used to identify each logical entity.

In some embodiments, each logical switch implements a L2 segment or a VXLAN, and the logical switch is in turn identified by the VNI (Virtual Network Identifier or VXLAN Network Identifier) of the L2 segment or the VXLAN. Specifically, in some embodiments, each data packets bears a VNI to identify the L2 segment that it is destined for, and the host machine accordingly uses the VNI of the packet to ensure that the data packet is handled by the correct logical switch, whether global or local. Analogously, in some embodiments, each distributed logical router (DLR) (whether a global logical router or a local logical router) is identified in the system by a DLR identifier (DLRI). In some embodiments, the multisite environment is a multi-tenant environment that implements logical networks for different tenants, and the DLRI of a distributed logical router is based on the identity of a tenant that uses the distributed router to implement the tenant's logical network.

Figure 2:
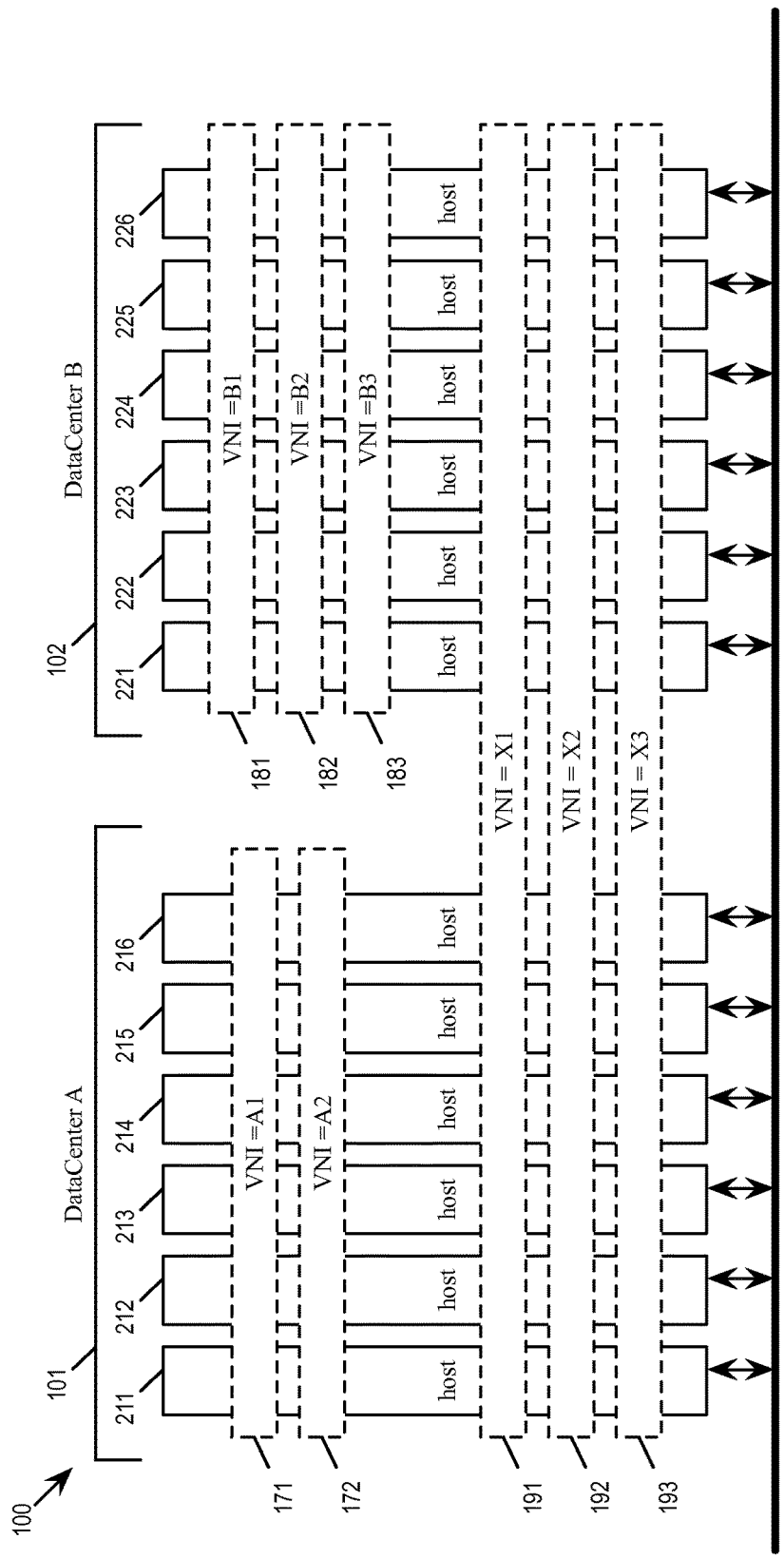
FIG. 2 illustrates local and global logical entities that are being implemented by host machines across different datacenters.

FIG. 2 illustrates local and global logical entities that are being implemented by host machines across different datacenters, where VNIs and DLRIs are used to identify the global logical entities and local logical entities. As illustrated, the datacenter 101 (datacenter A) has host machines 211-216 and the datacenter 102 (datacenter B) has host machines 221-226.

The VNI "A1" is associated with a L2 segment that is implemented by the local logical switch A1 (171). The VNI "A2" is associated with a L2 segment that is implemented by the local logical switch A2 (172). The VNIs A1 and A2 are recognized by host machines 211-216 of datacenter A. The VNI "B1" is associated with a L2 segment that is implemented by the local logical switch B1 (181). The VNI "B2" is associated with a L2 segment that is implemented by the local logical switch B2 (182). The VNI "B3" is associated with a L2 segment that is implemented by the local logical switch B3 (183). The VNIs B1, B2, and B3 are recognized by host machines 221-226 of datacenter B.

The VNIs of global logical switches are, on the other hand, recognized by. The VNI "X1" is associated with a L2 segment that is implemented by the global logical switch X1 (191). The VNI "X2" is associated with a L2 segment that is implemented by the global logical switch X2 (192). The VNI "X3" is associated with a L2 segment that is implemented by the global logical switch X3 (193). The VNIs X1, X2, and X3 are recognized by host machines 211-215 of datacenter A as well as host machines 221-226 of datacenter B.

In some embodiments, each logical router provides a set of logical interfaces (LIFs), each LIF for interfacing one L2 segment (or traffic from one logical switch) represented by one VNI. A local logical router provides a set of LIFs, each LIF for interfacing one local logical switch (or the L2 traffic of the corresponding VNI). A global logical router also provides a set of LIFs, each for interfacing one global logical switch (or the L2 traffic of the corresponding VNI).

Figure 3:
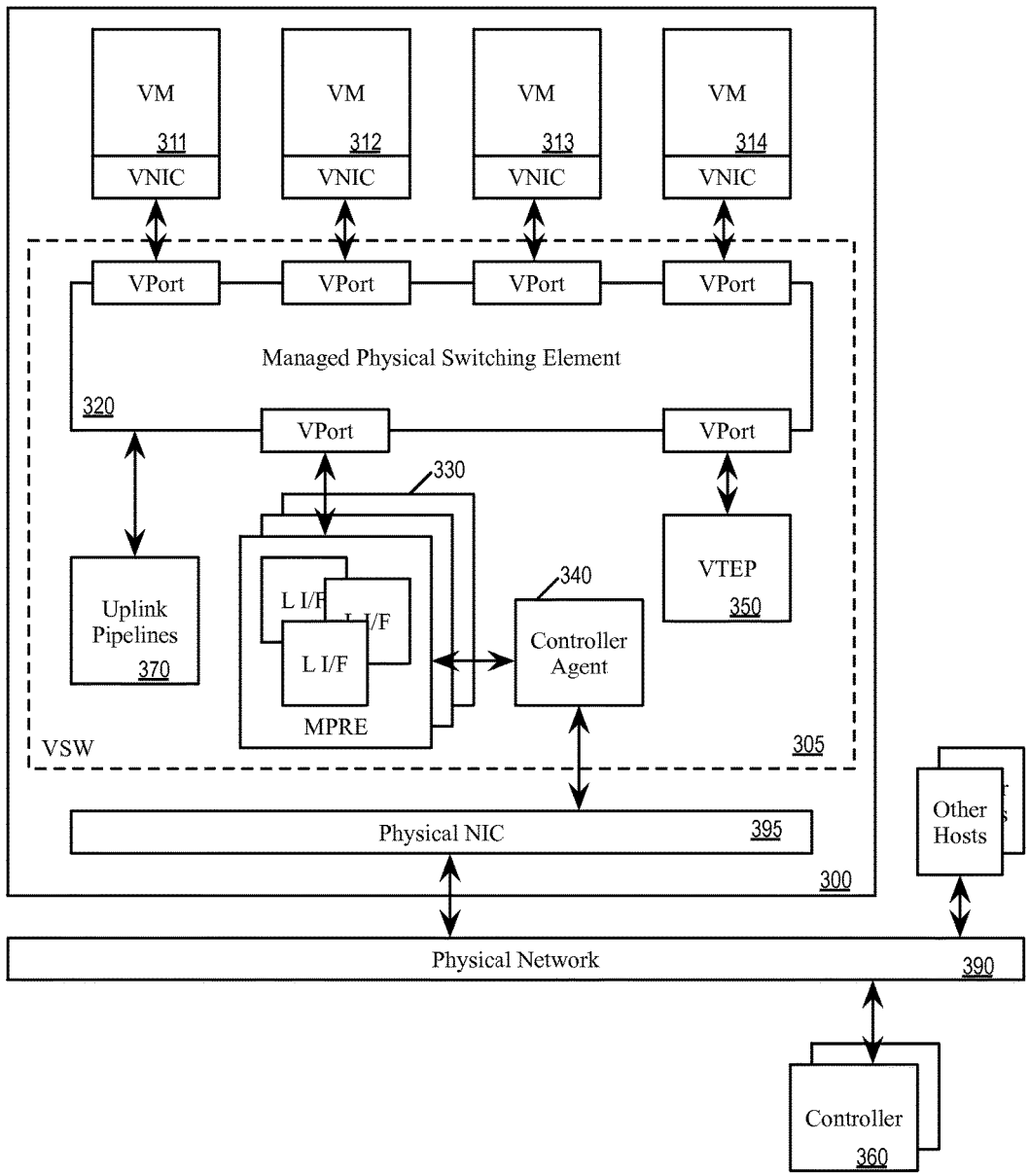
FIG. 3 illustrates a computing device that serves as a host machine for some embodiments of the invention.

FIG. 3 illustrates a computing device 300 that serves as a host machine for some embodiments of the invention. The host machine is running virtualization software that implements a physical switching element and a physical routing element.

As illustrated, the host machine 300 has access to a physical network 390 through a physical NIC (PNIC) 395. The host machine 300 also runs the virtualization software 305 and hosts VMs 311-314. The virtualization software 305 serves as the interface between the hosted VMs and the physical NIC 395 (as well as other physical resources, such as processors and memory). Each of the VMs includes a virtual NIC (VNIC) for accessing the network through the virtualization software 305. Each VNIC in a VM is responsible for exchanging packets between the VM and the virtualization software 305. In some embodiments, the VNICs are software abstractions of physical NICs implemented by virtual NIC emulators.

The virtualization software 305 manages the operations of the VMs 311-314, and includes several components for managing the access of the VMs to the physical network (by implementing the logical networks to which the VMs connect, in some embodiments). As illustrated, the virtualization software includes several components, including a MPSE 320, a MPRE 330, a controller agent 340, a VTEP 350, and a set of uplink pipelines 370.

The VTEP (VXLAN tunnel endpoint) 350 allows the host 300 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 300 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 370.

The controller agent 340 receives control plane messages from a controller or a cluster of controllers. In some embodiments, these control plane message includes configuration data for configuring the various components of the virtualization software (such as the MPSE 320 and the MPRE 330) and/or the virtual machines. In the example illustrated in FIG. 3, the controller agent 340 receives control plane messages from the controller cluster 360 from the physical network 390 and in turn provides the received configuration data to the MPRE 330 through a control channel without going through the MPSE 320. However, in some embodiments, the controller agent 340 receives control plane messages from a direct data conduit (not illustrated) independent of the physical network 390. In some other embodiments, the controller agent receives control plane messages from the MPSE 320 and forwards configuration data to the router 330 through the MPSE 320. In some embodiments, the controller agent 340 receives control plane data for global logical entities (switches and routers) from a global control cluster and control plane messages for local logical entities from a local control cluster of the datacenter. The global and local control clusters will be further described in Sections I and II below.

The MPSE 320 delivers network data to and from the physical NIC 395, which interfaces the physical network 390. The MPSE also includes a number of virtual ports (vPorts) that communicatively interconnects the physical NIC with the VMs 311-314, the MPRE 330 and the controller agent 340. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 390 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of the various global and local logical switches (e.g., GLS 191-193, LLS 171-172, LLS 181-183) according to the configuration of those logical switches.

The MPRE 330 performs L3 routing on data packets received from a virtual port on the MPSE 320. In some embodiments, this routing operation entails resolving L3 IP address to a next-hop L2 MAC address and a next-hop VNI (i.e., the VNI of the next-hop's L2 segment). Each routed data packet is then sent back to the MPSE 320 to be forwarded to its destination according to the resolved L2 MAC address. This destination can be another VM connected to a virtual port on the MPSE 320, or a reachable L2 network element on the physical network 390 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 330 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address, while each MPRE is also assigned a "physical" MAC address in order indicate in which host machine does the MPRE operate.

The uplink module 370 relays data between the MPSE 320 and the physical NIC 395. The uplink module 370 includes an egress chain and an ingress chain that each performs a number of operations. Some of these operations are pre-processing and/or post-processing operations for the MPRE 330. The operations of LIFs, uplink module, MPSE, and MPRE are described in U.S. patent application Ser. No. 14/137,862, published as U.S. Patent Application Publication 2015/0106804.

As illustrated by FIG. 3, the virtualization software 305 has multiple MPREs from multiple different LREs. In a multi-tenancy environment, a host machine can operate virtual machines from multiple different users or tenants (i.e., connected to different logical networks). In some embodiments, each user or tenant has a corresponding MPRE instantiation in the host for handling its L3 routing. In some embodiments, each of these LREs can be either a global logical router of a global logical network (e.g., the GLR 194 of the global logical network X) or a local logical router of a local logical network (e.g., the LLR 173 of the local logical network A). In some embodiments, though the different MPREs belong to different tenants, they all share a same vPort on the MPSE 320, and hence a same L2 MAC address (VMAC or PMAC). In some other embodiments, each different MPRE belonging to a different tenant has its own port to the MPSE.

The MPSE 320 and the MPRE 330 make it possible for data packets to be forwarded amongst VMs 311-314 without being sent through the external physical network 390 (so long as the VMs connect to the same logical network, as different tenants' VMs will be isolated from each other). Specifically, the MPSE performs the functions of the global and local logical switches by using the VNIs of the various global and local L2 segments (i.e., their corresponding L2 logical switches) of the various global and local logical networks. Likewise, the MPREs perform the function of the global and local logical routers by using the VNIs of those various global and local L2 segments. Since each L2 segment/L2 switch has its own a unique VNI, the host machine 300 (and its virtualization software 305) is able to direct packets of different logical networks to their correct destinations and effectively segregates traffic of different logical networks from each other.

Figure 4:
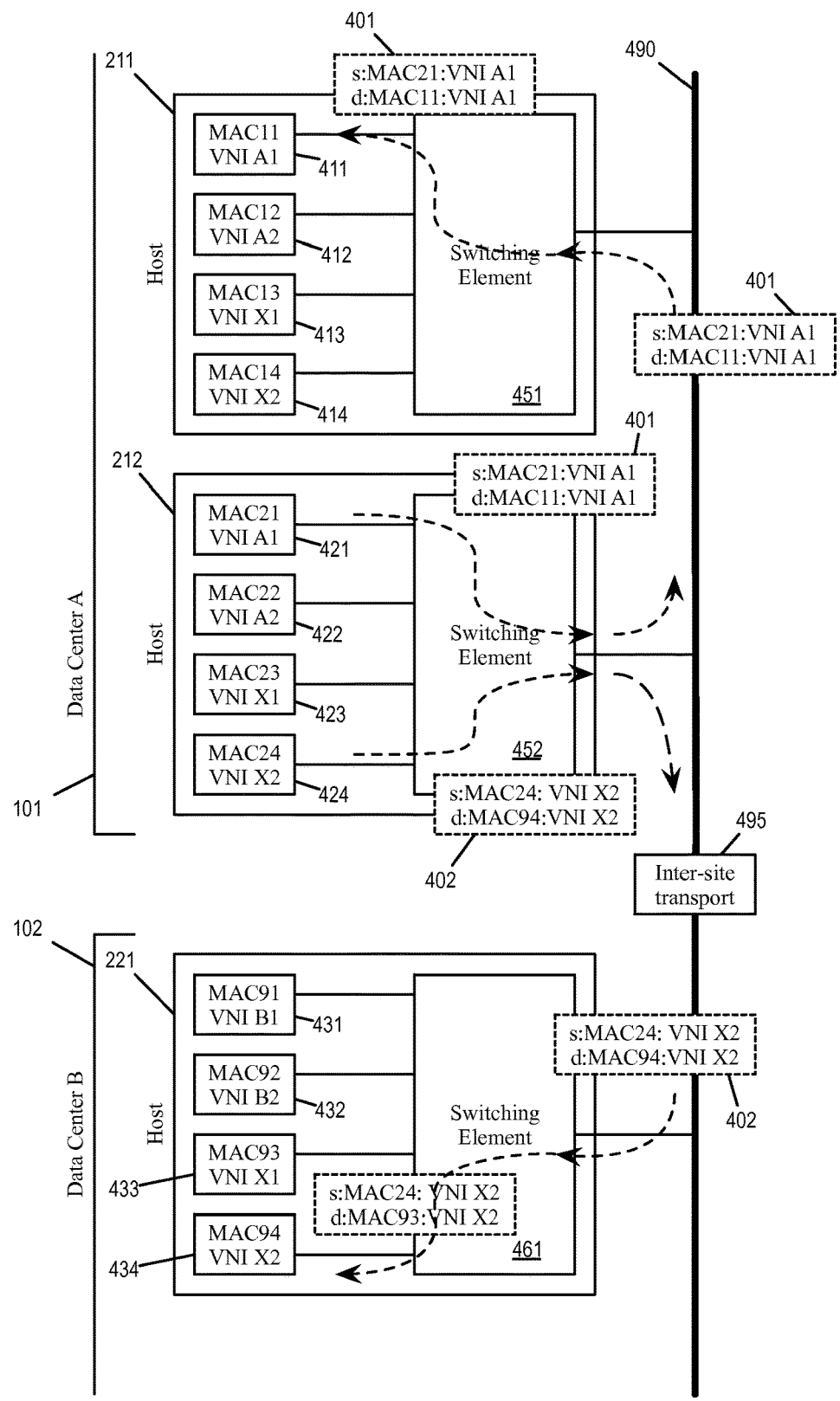
FIG. 4 illustrates L2 packet forwarding operations performed by local and global logical switches.

FIG. 4 illustrates L2 packet forwarding operations performed by local and global logical switches. The figure illustrates a first example packet forwarding operation by the local logical switch A1 (171) and a second example packet forwarding operation by the global logical switch X2 (192). Physically, these operations are performed by the switching elements of (MPSEs) of the host machines across different datacenters.

The first example packet forwarding operation is from a VM 421 with MAC address "MAC21" to a VM 411 with MAC address "MAC11". The VM 411 is operating on the host machine 211 and the VM 421 is operating on the host machine 212. Both host machines 211 and 212 are in the datacenter A (101). Both the VM 411 and the VM 421 belong to the same L2 segment having the VNI "A1", which corresponds to the local logical switch 171 of the logical network A.

As illustrated, a packet 401 is produced by the VM 421 having source address "MAC21" and VNI "A1" and destination address "MAC11" and VNI "A1". Since both source and destination have the same VNI, the packet does not need L3 routing. The switching element 452 of the host machine 212 receives the packet 401 and forwards it across the physical network 490 to the host machine 211. The switching element 451 of the host machine 211 in turn forwards the packet to the VM 411 according to the MAC address "MAC11" and the VNI "A1". This packet forwarding operation stays entirely within the datacenter 101, since both the source and the destination belongs to the same local logical switch with VNI "A1". In this sequence of operations, the switching element 452 and the switching element 451 jointly perform the functions of the LLS 171.

The second example packet forwarding operation is from a VM 424 with MAC address "MAC24" to a VM 434 with MAC address "MAC94". The VM 424 is operating on the host machine 212 and the VM 434 is operating on the host machine 221. The host machines 212 is in the datacenter A (101), and the host machine 221 is in the datacenter B (102).

Both the VM 424 and the VM 434 belong to the same L2 segment having the VNI "X2", which corresponds to the global logical switch 192 of the global logical network X.

As illustrated, a packet 402 is produced by the VM 424 having source address "MAC24" and VNI "X2" and destination address "MAC94" and VNI "X2". Since both source and destination have the same VNI, the packet does not need L3 routing. The switching element 452 of the host machine 212 receives the packet 402 and forwards it across the physical network 490 to the host machine 221. Since these host machines are physically in different datacenters/sites, the packet is forwarded through an inter-site transport 495, which in some embodiments is implemented by encapsulation and encryption across the Internet. Once the packet 402 reaches the host machine 221 at the datacenter 102, the switching element 461 of the host machine 221 forwards the packet to the VM 434 according to the MAC address "MAC94" and the VNI "X2". In this sequence of operations, the switching element 452 and the switching element 461 jointly perform the functions of the GLS 192.

Figure 5:
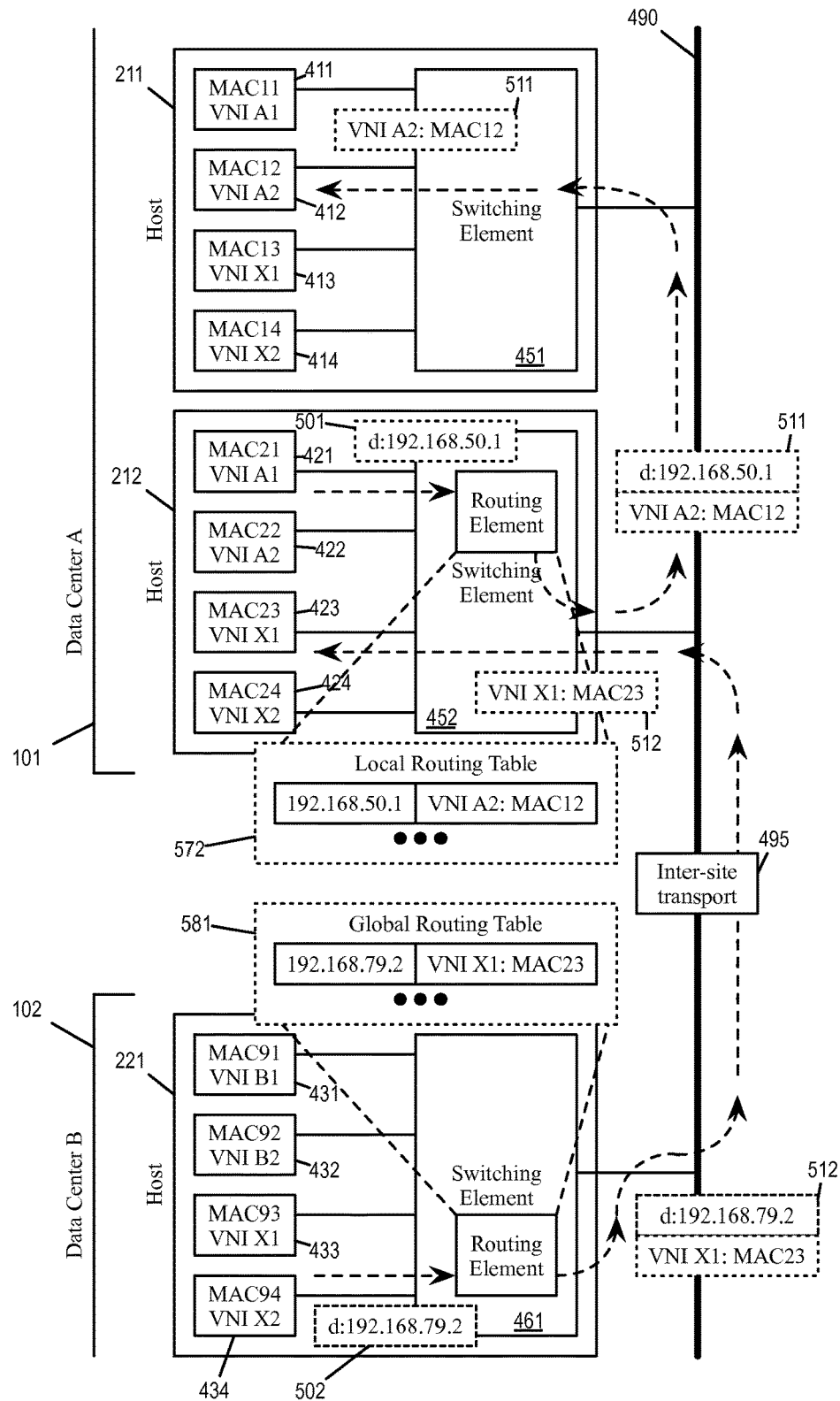
FIG. 5 illustrates L3 packet forwarding operations performed by local and global logical routers.

FIG. 5 illustrates L3 packet forwarding operations performed by local and global logical routers. The figure illustrates a first example packet forwarding operation by the local logical router A3 (173) in the local logical network A. The figure also illustrates a second example packet forwarding operation by the global logical router X4 (194) in the global logical network X. These operations are physically performed by the physical routing elements of (MPREs) of the host machines in different datacenters.

The first example packet forwarding operation is from the VM 421 with MAC address "MAC21" to a VM 412 with MAC address "MAC12". This packet forwarding operation is part of the network traffic of the local logical network A. The VM 412 is operating on the host machine 211 and the VM 421 is operating on the host machine 212. Both host machines 211 and 212 are in the datacenter A (101). However, the VM 421 and the VM 412 are on different L2 segments with different VNIs ("A1" and "A2", respectively). The packet will therefore have to be routed by L3 router according to L3 IP address.

As illustrated, a packet 501 is produced by the VM 421 having destination IP address "192.168.50.1", which corresponds to the VM 411. The switching element 452 of the host machine 212 forwards the packet to its routing element 552 in order to determine the next hop. The routing element 552 uses its routing table 572 to look up the next hop L2 MAC address and VNI for the L3 destination IP address "192.168.50.1". The look up yields MAC address "MAC12" and VNI "A2", which is used to create the routed packet 511. The routing element in turn forwards the routed packet 511 back to the switching element 452 and onto the physical network 490. The routed packet 511 reaches the host machine 211, whose switching element 451 uses the VNI "A2" and the destination MAC address "MAC12" to send the routed packet 511 to the VM 412. In this sequence of operations, the switching element 452 performs the functions of the LLS 171 (A1), the routing element 552 performs the functions of the LLR 173 (A3), and the switching element 451 performs the function of the LLS 172 (A2).

The second example packet forwarding operation is from the VM 434 with MAC address "MAC94" to a VM 423 with MAC address "MAC23". This packet forwarding operation is part of the network traffic of the global logical network X. The VM 434 is operating on the host machine 221 and the VM 423 is operating on the host machine 212. The host machines 221 and the host machine 212 are in different datacenters (101 and 102). Furthermore, the VM 434 and the VM 423 are on different L2 segments with different VNIs ("X1" and "X2", respectively). The packet will therefore have to be routed by L3 router according to L3 IP address.

As illustrated, a packet 502 is produced by the VM 434 having destination IP address "192.168.79.2" (which corresponds to the VM 424). The switching element 461 of the host machine 221 forwards the packet 502 to its routing element 561 in order to determine the next hop. The routing element 561 uses its routing table 581 to look up the next hop L2 MAC address and VNI for the L3 destination IP address "192.168.79.2". The look up yields MAC address "MAC23" and VNI "X1", which is used to create the routed packet 512. The routing element 561 in turn forwards the routed packet 512 back to the switching element 461 and onto the physical network 490. Since the source host machine 221 is in datacenter B and the destination host machine 212 is in datacenter A, the packet 512 has to go through the inter-site transport 495 in order to reach its destination.

The routed packet 512 reaches the host machine 212, whose switching element 452 uses the VNI "X1" and the destination MAC address "MAC23" to send the routed packet 512 to the VM 423. In this sequence of operations, the switching element 461 performs the functions of the GLS 192 (X2), the routing element 561 performs the functions of the GLR 194 (X4), and the switching element 452 performs the function of the GLS 191 (X1).

Several more detailed embodiments of the invention are described below. Section I discusses control clusters in a multi-site environment. Section II describes the distribution of routing information in a multi-site environment. Section III describes the provisioning of the global logical entities. Section IV describes error recovery mechanisms in a multi-site environment. Finally, section V describes an electronic system with which some embodiments of the invention are implemented.

I. Control Clusters

A control cluster is a collection of machines that control the operations of host machines in a datacenter. By controlling the host machines of a datacenter, the control cluster also controls the operations of the physical switching elements, the physical routing elements, and other elements operating in each of the host machines. As physical switching elements and physical routing elements across different host machines jointly implement logical switches and routers for various logical networks, the control cluster also controls the operations of those logical networks by controlling their logical switches and routers. In some embodiments, a global control cluster (GCC) controls the operations of global logical entities across multiple datacenters, while local control clusters (LCCs) control the operations of local logical entities. In some embodiments, a global control cluster controls the global logical entities by control plane messages to the host machines that implement the global entities, while a local control cluster controls the local logical entities by control plane messages to the host machines that implement the local logical entities.

Figure 6:
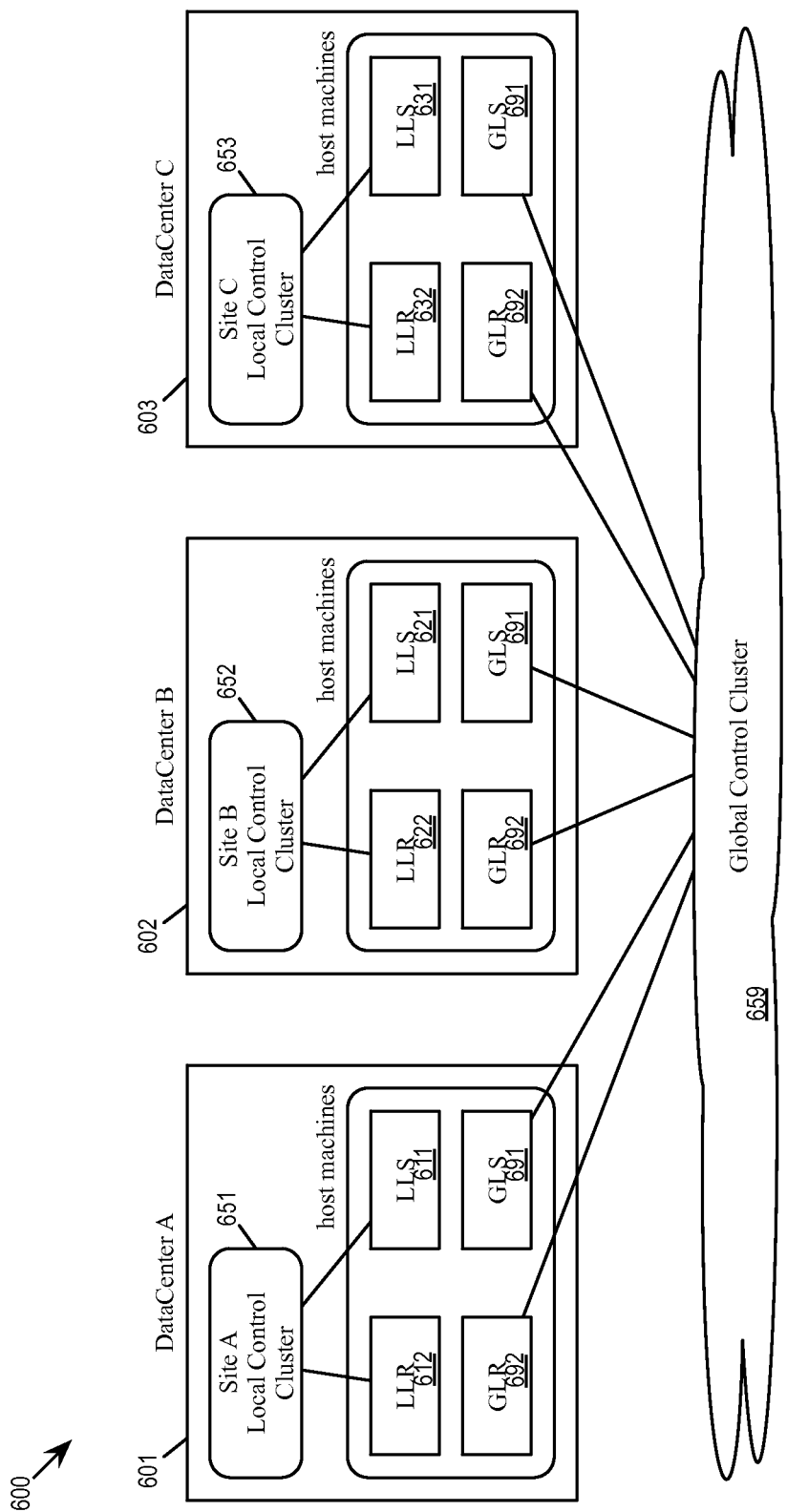
FIG. 6 illustrates global logical entities across different datacenters that are controlled by a global control cluster and local logical entities that are controlled by local control clusters.

FIG. 6 illustrates global logical entities across different datacenters that are controlled by a global control cluster and local logical entities that are controlled by local control clusters. The figure illustrates three interconnected datacenters 601-603 in a multi-site environment 600. The datacenters 601-603 jointly implement a set of global logical switches 691 and global logical routers 692. Each of the datacenters also implements a set of local logical switches and local logical routers that are local to the datacenter. Specifically, the datacenter 601 implements local logical switches 611 and local logical routers 612 that are site-local to the datacenter 601. The datacenter 602 implements local logical switches 621 and local logical routers 622 that are site-local to the datacenter 602. The datacenter 603 implements local logical switches 631 and local logical routers 632 that are site-local to the datacenter 603.

Each datacenter has its own corresponding local control cluster for controlling the local logical entities of that datacenter. As illustrated, the local logical entities 611 and 612 of the datacenter 601 are controlled by a local control cluster 651 of the site 601. The local logical entities 621 and 622 of the datacenter 602 are controlled by a local control cluster 652 of the site 602. The local logical entities 631 and 632 of the datacenter 603 are controlled by a local control cluster 653 of the site 603. In some embodiments, a local control cluster of a data site is implemented by machines that are physically located in the site. In some embodiments, the local control cluster of a datacenter is implemented as VMs running on host machines of the datacenter. In some embodiments, the local control cluster of a data site can be implemented by machines that are physically located elsewhere but are communicatively linked with the datacenter (e.g., through the Internet).

Datacenters 601-603 also implements each of the global entities. In other words, the host machines of datacenter 601, 602, and 603 are all implementing global logical switches 691 and global logical routers 692. These global logical switches and global logical routers are all controlled by a global control cluster 659. The global control cluster controls the host machines in all of the datacenters that are implementing the global logical entities, regardless of where the global control cluster is actually located. In some embodiments, the global control cluster is implemented in one of the datacenters, and it sends control plane messages via inter-site transport to other datacenters in order to control the global logical entities implemented there. In some embodiments, the global control cluster is located in the cloud (e.g., Internet) rather than in any particular datacenter.

Having separate control clusters for local logical entities and global logical entities means that each datacenter has its own local control cluster. In the example illustrated in FIG. 6, this means the datacenter 601 can operate its own local logical entities 611 and 612 without worrying about how datacenter 602 operates its local logical entities 621 and 622 and how the datacenter 603 operates its local logical entities 631 and 632, so and so forth.

As mentioned, a host machine is able to segregate traffic between the different logical networks, because each L2 segment or logical switch that it handles has its own unique VNI. This means that, for a datacenter, the VNIs assigned to global logical switches cannot be assigned to local logical switches, or the pool of VNIs available for global logical switches and the pool of VNIs available for local logical switches must not overlap. However, since each datacenter has its own local control cluster, each datacenter may freely assign VNIs to its own local logical entities without worrying about whether another datacenter is assigning the same VNIs to its own logical entities. In other words, the pool of VNIs available for local logical switches of one datacenter may overlap the pool of VNIs available for local logical switches of another datacenter.

Figure 7:
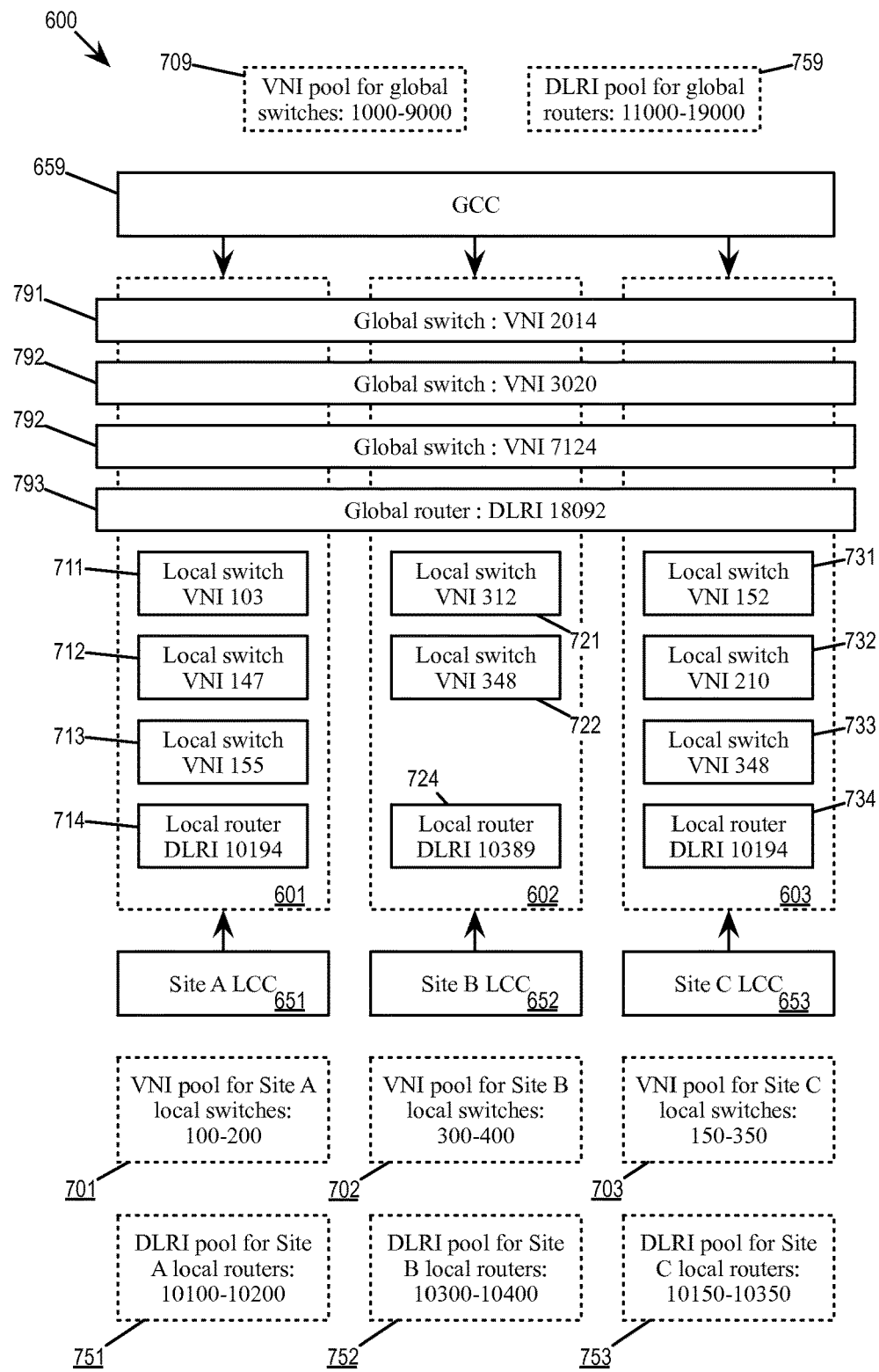
FIG. 7 conceptually illustrates assignment of VNIs and DLRIs in a multi-site environment in which local logical entities are controlled by local control clusters while global logical entities are controlled by a global control cluster.

FIG. 7 conceptually illustrates assignment of VNIs (and DLRIs) in the multi-site environment 600 in which local logical entities are controlled by local control clusters while global logical entities are controlled by a global control cluster. The multi-site environment allocates a pool 709 of VNIs for the global logical switches, while the datacenters 601-603 respectively allocate pools of VNIs 701-703 for their local logical switches. The local VNI pools 701-703 may overlap each other but they do not overlap the global VNI pool 709. Likewise, the multi-site environment allocates a pool 759 of DLRIs for the global logical routers, while the datacenters 601-603 respectively allocate pools of DLRIs 751-753 for their local logical routers. The local DLRI pools 751-753 may overlap each other but they do not overlap the global DLRI pool 759.

As illustrated, the global pool 709 allows VNIs in range of 1000 to 9000. The global logical switches 791-792 are each assigned a VNI from this pool (VNIs 2014, 3020, and 7124, respectively). The local pool 701 allows VNIs in range of 100 to 200. The local logical switches 711-713 of the datacenter 601 are each assigned a VNI from this pool (VNIs 103, 147, and 155). The local pool 702 allows VNIs in range of 300 to 400. The local logical switches 721-722 of the datacenter 602 are each assigned a VNI from this pool (VNIs 312, and 348). The local pool 703 allows VNIs in range of 150 to 350. The local logical switches 731-733 of the datacenter 603 are each assigned a VNI from this pool (VNIs 152, 210, and 348). The local pool 703 overlaps both local pools 701 and 702, which allows a particular VNI to be assigned to different local logical switches in different datacenters (the VNI "348" is assigned to both the local logical switch 722 of the datacenter 602 and the local logical switch 733 of the datacenter 603).

The global pool 759 allows DLRI in range of 11000 to 19000. The global logical router 793 is accordingly assigned a DLRI from this pool (DLRI 18092). The pool 751 allows DLRIs in range of 10100 to 10200. The local logical routers 714 of the datacenter 601 is assigned a DLRI from this pool (DLRI 10194). The local pool 752 allows DLRIs in range of 10300 to 10400. The local logical routers 724 of the datacenter 602 is assigned a DLRI from this pool (DLRI 10389). The local pool 753 allows DLRIs in range of 10150 to 10350. The local logical routers 734 of the datacenter 603 is assigned a DLRI from this pool (DLRI 10194). The pool 753 overlaps both pools 751 and 752, which allows a particular DLRI to be assigned to different local logical routers in different datacenters (the DLRI "10194" is assigned to the local logical router 714 of the datacenter 601 and the local logical router 734 of the datacenter 603).

Figure 8A:
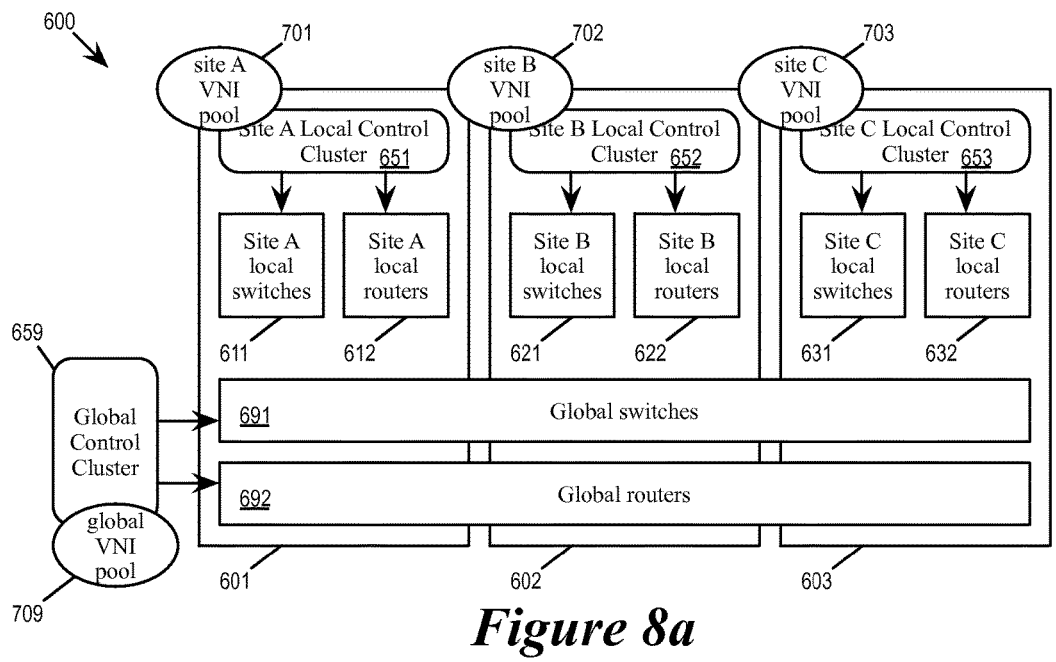
FIG. 8a conceptually illustrates a multisite environment in which the global control cluster controls only the global logical entities while local control clusters control local logical entities.
Figure 8B:
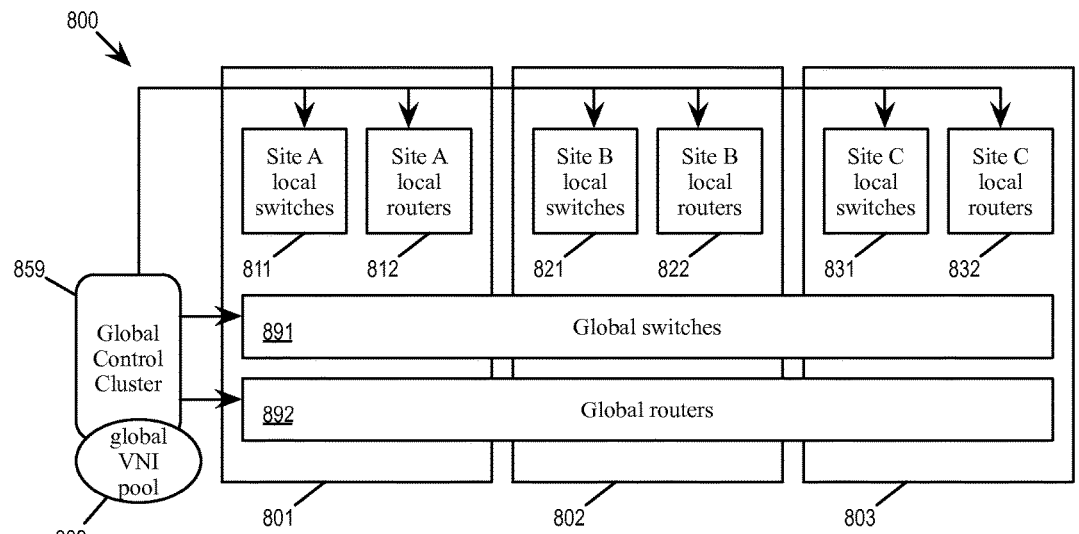
FIG. 8b conceptually illustrates an alternative multisite environment in which one global control cluster controls all logical entities in all participating datacenters.

In some embodiments, a global control cluster controls all logical entities across all participating sites, regardless of whether those logical entities are global logical entities or local logical entities. This is in contrast with the multi-site environment in which the global control cluster controls only the global logical entities while local control clusters control local logical entities. FIGS. 8a and 8b illustrate these two types of multi-site environment.

FIG. 8a conceptually illustrates the multisite environment 600 in which the global control cluster controls only the global logical entities while local control clusters control local logical entities. As illustrated, the global control cluster 659 controls only the global logical switches 691 and global routers 692, leaving the logical switches and routers of each datacenter to be controlled by the local control cluster of that datacenter. Consequently, each datacenter can have its own pool of VNIs (and DLRIs) for its local logical entities (VNI pools 701-703 and DLRI pools 751-753 for datacenters 601-603), and those pools of VNIs (and DLRIs) may overlap.

FIG. 8b conceptually illustrates an alternative multi-site environment 800 in which one global control cluster 859 controls all logical entities in all participating datacenters 801-803. As illustrated, the datacenters 801-803 are jointly operating global logical switches 891 and global logical routers 892. These global logical entities are controlled by the global control cluster 859. The datacenter 801 is operating local logical switches 811 and local logical router 812. The datacenter 802 is operating local logical switches 821 and local logical router 822. The datacenter 803 is operating local logical switches 821 and local logical router 832. All of these local logical entities (811, 812, 821, 822, 831, 832) are also controlled by the global control cluster 859.

Since the global control cluster 859 is controlling all of the logical entities, each logical entity, regardless of whether it's a local or global, must have a unique VNI (or DLRI) in the multi-site environment 800 in order for it to be uniquely identifiable by the global control cluster 859. For example, there is only one pool of VNIs (859), and each VNI in this pool can only be assigned to one logical switch, whether local or global.

II. Distributing Routing Information

In some embodiments, one of the tasks of a control cluster when controlling a logical network is to collect information learned by host machines or physical routers during the operations of the logical network. The control cluster in turn generates and distributes routing instructions such as routing table entries to the various host machines implementing the logical network.

Figure 9:
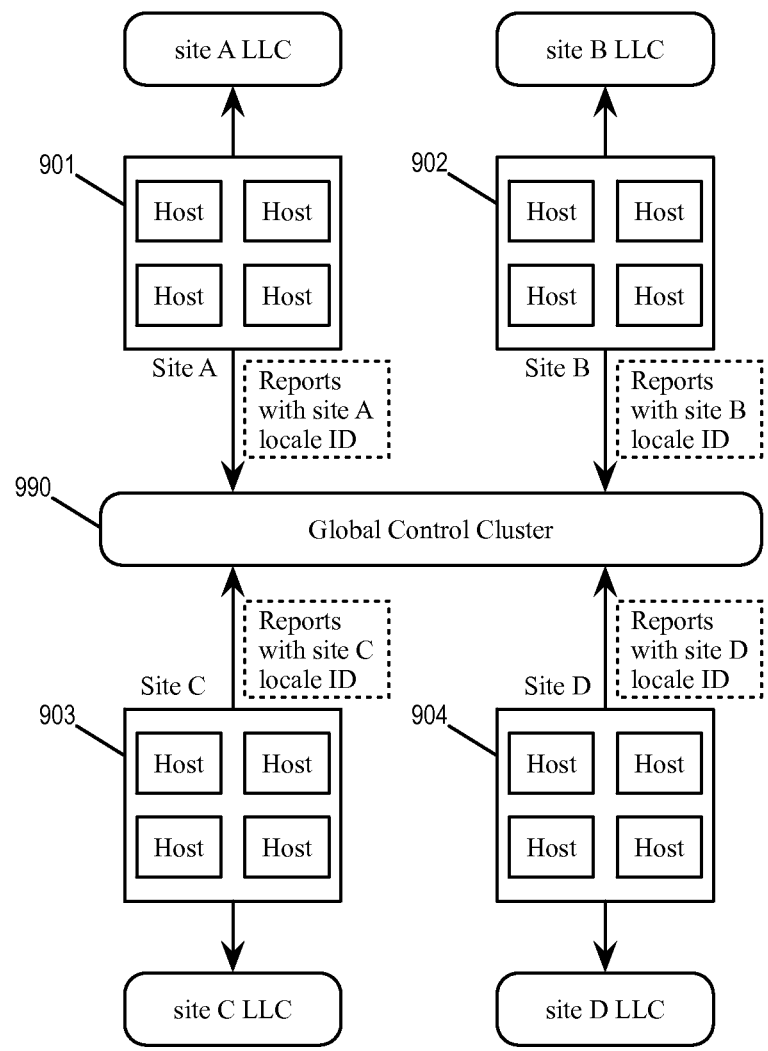
FIG. 9 illustrates the reporting of information collected by datacenters in a multi-site environment.

In order to implement logical networks that span multiple datacenters, the global control cluster collects and distributes routing information across the multiple datacenters. Some embodiments associate the collected routing information with locale identifiers. A locale identifier is for identifying a datacenter. FIG. 9 illustrates the reporting of information collected by datacenters 901-904 in a multi-site environment 900. Each datacenter report its collected information to its own local control cluster as well as to a global control cluster 990. The information reported to the global control cluster by each datacenter is associated with the datacenter's locale ID.

In some embodiments, a locale identifier is for identifying a particular routing path or a forwarding hop as being in a particular datacenter. In some embodiments, a locale identifier is for identifying a set of routing information as being collected at a particular datacenter. In some embodiments, the global control cluster uses locale identifiers associated with routing information to determine where the available routing resources are and to plan routing paths. In some embodiments, the global control cluster distributes routing information to host machines, the distributed routing information being associated with locale identifiers such that the receiving host machines would be able to determine the locale (i.e., the site or the datacenter) of routing paths or forwarding hops and so to be able to forward packets accordingly.

In some embodiments, the routing information collected and reported by a datacenters includes routing information that are learned by edge routers or gateways of the datacenter. In some embodiments, the edge routers or gateways learns the information from the external world (e.g., Internet) though protocols such as Boarder Gateway Protocol (BGP) for exchanging routing and reachability information. Since a global logical entity spans multiple datacenters, a global control cluster controlling the global logical entity would receive multiple reports of such learned edge routing information from multiple different edge routers in multiple different datacenters. In some embodiments, each of such reports is associated with the locale identifier of the reporting datacenter so that the global control cluster can distinguish different sets of routing information from different datacenters.

Figure 10:
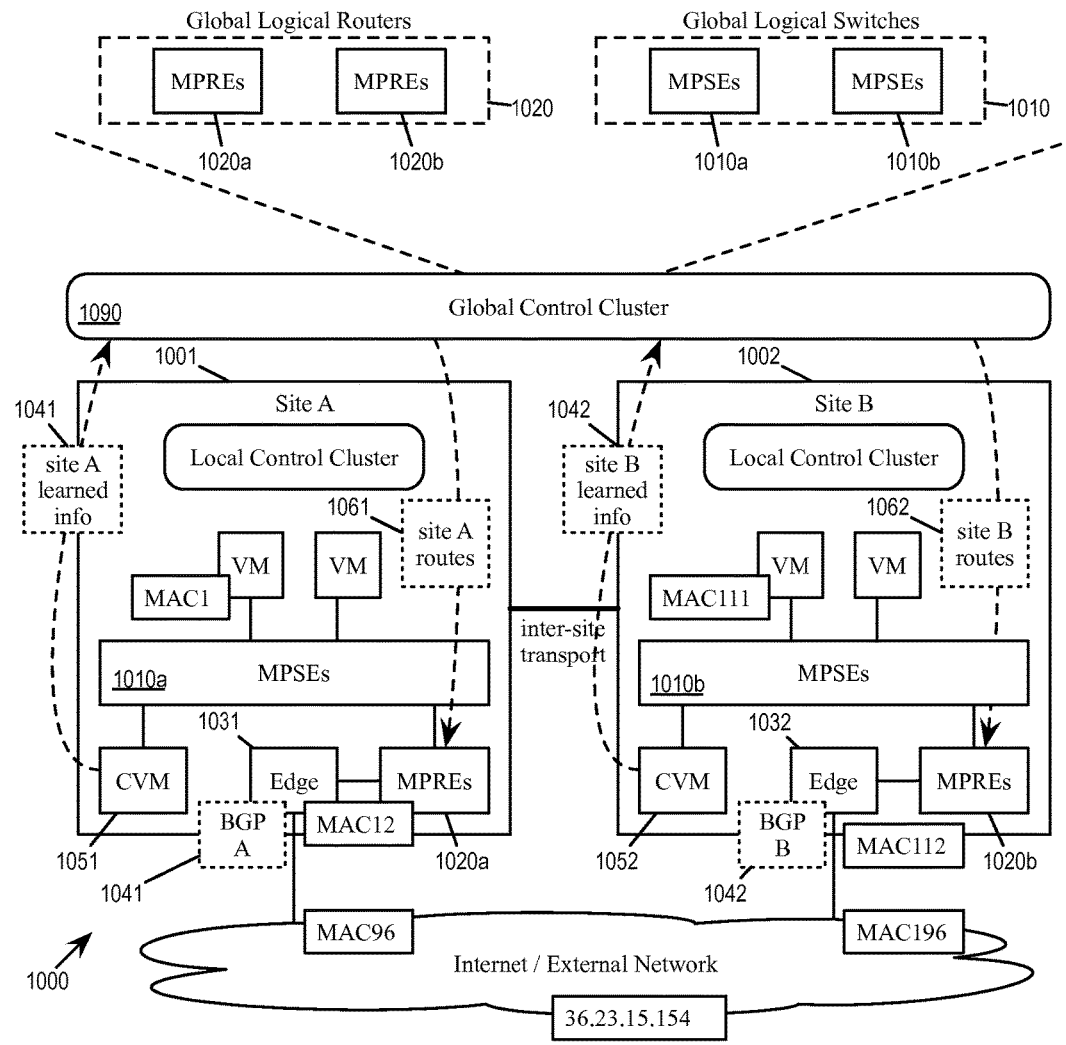
FIG. 10 illustrates the collection and distribution of edge routing information using locale identifiers in a multi-site environment.

FIG. 10 illustrates the collection and distribution of edge routing information using locale identifiers in a multi-site environment 1000. The edge routing information are leaned by edge routers/gateways of the datacenters and reported to a global control cluster, which in turn distributes the information to the host machines implementing global logical switches and routers. The reported edge routing information are associated with locale identifiers, and the global control cluster uses the locale identifiers to filter the distribution of the routing information. This ensures that each host machine receives only the routing information that it needs to forward packets out into the external world.

As illustrated, the multi-site environment 1000 includes datacenters 1001 (site A) and 1002 (site B). The datacenters of the multi-site environment are jointly operating a set of global logical switches 1010 and a global logical router 1020. The set of global logical switches 1010 are implemented by a set of physical switching element (MPSE) 1010*a* in site A and by a set of physical switching element 1010*b* in site B. The global logical router 1020 is implemented by a set of physical routing elements (MPRE) 1020*a* in site A and by a set of physical routing elements 1020*b* in site B. The physical switching elements 1010*a* and the physical routing element 1020*a* are provided by host machines of site A, while the physical switching elements 1010*b* and the physical routing element 1020*b* are provided by host machines of site B.

The multi-site environment 1000 is connected to an external network, and the global logical networks as implemented by the global logical routers 1010 and switches 1020 in the multi-site environment therefore have logical access to the external network. This access is implemented by an edge router 1031 at the datacenter 1001 and an edge router 1032 at the datacenter 1002. In other words, the edge router 1031 is the local egress/ingress of the global logical network at site A, and the edge router 1032 is the local egress/ingress of the global logical network at site B. In some embodiments, the edge routers 1031 and 1032 support only local egress but not local ingress.

As illustrated, the edge router 1031 is in BGP exchange with the external network and has learned a set of routing information 1041 for site A. Likewise, the edge router 1032 is in BGP exchange with the external network and has learned a set of routing information 1042 at site B. Each of these sets of learned routing information is reported to the global control cluster 1090.

To facilitate the reporting of routing information learned by edge routers, some embodiments provision a control VM (CVM) for each edge router or gateway. Like other VMs in a datacenter, the control VM is operated by one of the host machines in the datacenter, but it is dedicated to handling the reporting of routing information by e.g., tagging the learned routing information with the locale ID of its datacenter. As illustrated, the edge router 1031 has a corresponding control VM 1051 and the edge router 1032 has a corresponding control VM 1052. The control VM 1051 retrieves the routing information 1041 from the edge router 1031, tags it with the locale ID of site A, and reports the tagged information to the global control cluster 1090. Likewise, the control VM 1052 retrieves the routing information 1042 from the edge router 1032, tags it with the locale ID of site B, and reports the tagged information to the global control cluster.

Upon receiving the reported routing information, the global control clusters has a set of routing information tagged with the locale ID of site A (1001) and a set of routing information tagged with the locale ID of site B (1002). The global control cluster 1090 then processes the collected information and distributes the processed information to the host machines in the datacenters. In some embodiments, the distributed information includes routing table entries for the physical routing elements (MPREs) 1020a and 1020b.

In some embodiments, the global control cluster sends each physical routing element only the routing information that it needs to forward data into destinations in the external network. For the physical routing elements 1020a of site A, information it needs to communicate with the external network is based on the information learned by the edge router 1031 of site A (rather than the information learned by the edge router 1032 of site B). In other words, only routing information associated with the locale ID of the datacenter 1001 (site A) will be distributed to the physical routing elements 1020a. Consequently, the global control cluster 1090 sends site A routing information 1061 to the physical routing elements 1020a that are based on routing information learned by the site A's edge router (1031). Likewise, the global control cluster 1090 sends site B routing information 1062 to the physical routing elements 1020b that are based on routing information learned by the site B's edge router (1032).

FIG. 10 also illustrates some example routing information that are distributed to the physical routing elements of the different datacenters. The global routing cluster 1090 distributes the routing information to the different datacenters by selecting only the relevant information based on locale IDs. As illustrated, site A routing information 1061 and site B routing information 1062 both include routing table entries for destination IP "36.23.15.154", which is a network location in the external network. However, site A routing information is based on BGP exchanges conducted by the edge router 1031 at site A, while the site B routing information is based on BGP exchanges conducted by the edge router 1032 at site B. The site A routing information is associated with site A's locale ID, while site B's routing information is associated with site B's locale ID.

The site A routing information 1061 for reaching the destination IP address "36.23.15.154" includes entries that hop from "MAC11" to "MAC12" and then from "MAC12" to "MAC96". The MAC addresses "MAC11" and "MAC12" are both network nodes of site A, while the MAC address "MAC96" is a node in the external network that interfaces the edge router of site A. The site B routing information 1062 for reaching the destination IP address "36.23.15.154" includes entries that hop from "MAC111" to "MAC112" and then from "MAC112" to "MAC 196". The MAC addresses "MAC 111" and "MAC 112" are both network nodes of site B, while the MAC address "MAC196" is a node in the external network that interfaces the edge router of site B.

Figure 11:
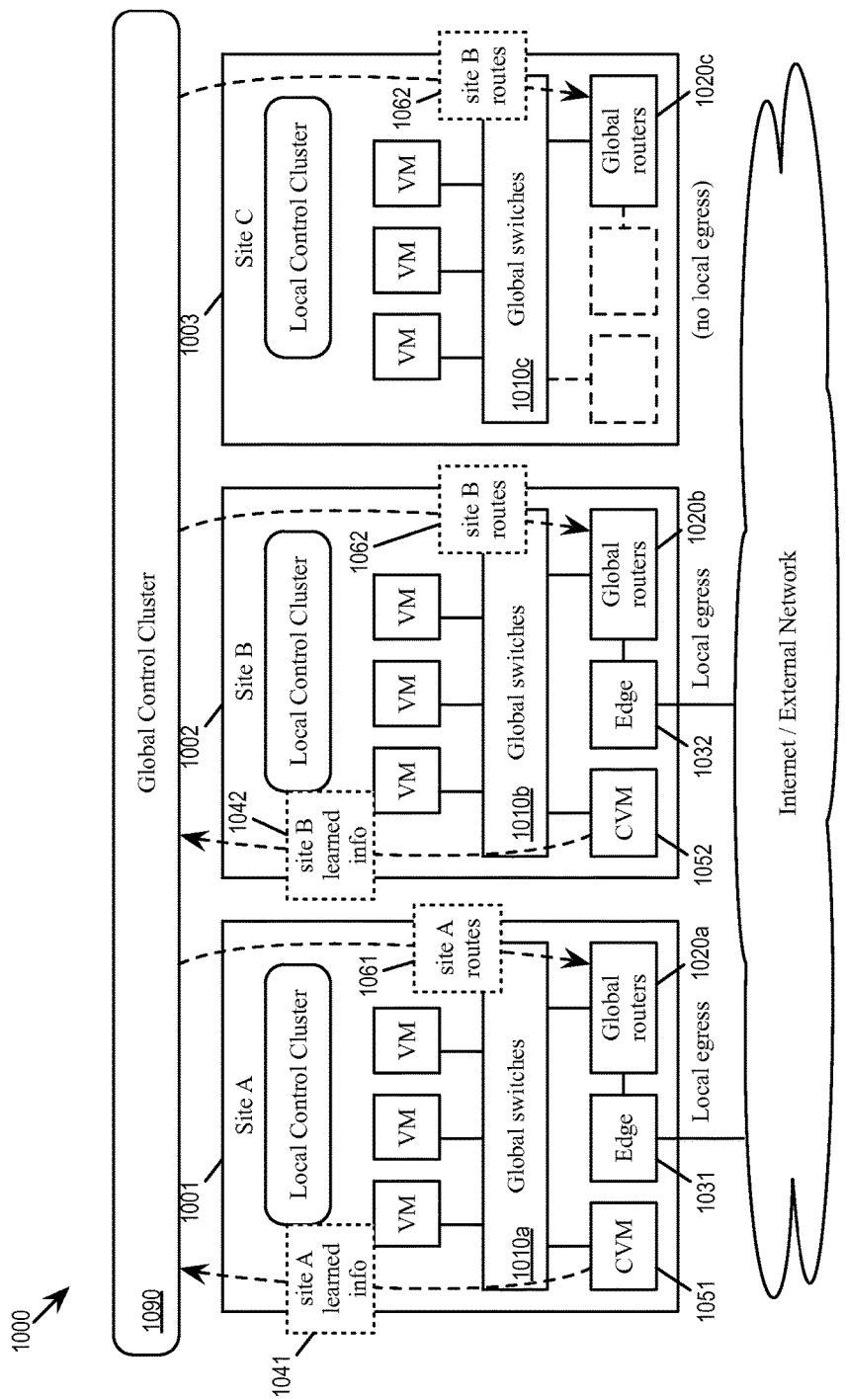
FIG. 11 illustrates a multi-site environment in that has a datacenter without local egress to the external network.

In some embodiments, one or more of the datacenters in a multi-site environment may not have local access to the external network (i.e., no local egress) and have to rely on other datacenters for access to the external network. FIG. 11 illustrates a multi-site environment in that has a datacenter without local egress to the external network. As illustrated, in addition to the datacenters 1001 (site A) and 1002 (site B), the multi-site environment also has a datacenter 1003 (site C). However, unlike datacenters 1001 and 1002 that each has local egress of its own to the external network, the datacenter 1003 does not have a local egress. In some embodiments, this means that the host machines of site C has to rely on site A or site B for access to the external network.

The datacenter 1003 is jointly operating the set of global logical switches 1010 and the global logical router 1020 with the other two datacenters 1001 and 1002. The set of global logical switches 1010 are implemented by a set of physical switching elements 1010c in site C (along with the set of physical switching elements 1010a of site A and the set of physical switching element 1010b in site B). The global logical router 1020 is implemented by a set of physical routing elements 1020c in site C (along with the physical routing elements 1020a of site A and the set of physical switching element 1020b in site B). The physical switching element 1010c and the physical routing element 1020c are provided by host machines of site C. The global control cluster 1090 controls the host machines of site C as it does site A and site B in order to control the operations of the global logical routers and switches.

The datacenter 1003 does not have its own edge router to provide local egress to the external network. The datacenter 1003 therefore does not conduct its own BGP exchanges with the external network and does not report edge routing information of its own to the global logical router 1090. Consequently, the datacenter 1003 does not provision a control VM for reporting edge routing information to the global control cluster 1090.

In some embodiments, when a particular datacenter does not have edge routing information of its own, the global control cluster would distribute edge routing information from other datacenters to the particular datacenter. In some embodiments, one of the datacenters with local egress is designated as the default site, whose edge routing information is distributed to the particular datacenter without its own local egress to the external network.

In this example, since the datacenter 1003 does not have edge routing information of its own, the global control cluster 1090 distributes the edge routing information 1062 of the datacenter 1002 (site B routes) to the physical routing elements 1020c. As a result, the network traffic being routed by the physical routing element 1020c (on behalf of the global logical router 1020) will be sent to site B for egress to the external network, relying on the routing information learned by the edge router 1032. In some embodiments, the site B routing information being distributed to the physical routing elements 1020c is tagged with the locale ID of site B. The physical routing elements 1020c would therefore know that the corresponding entries in their routing table are referring to network nodes in site B.

Figure 12:
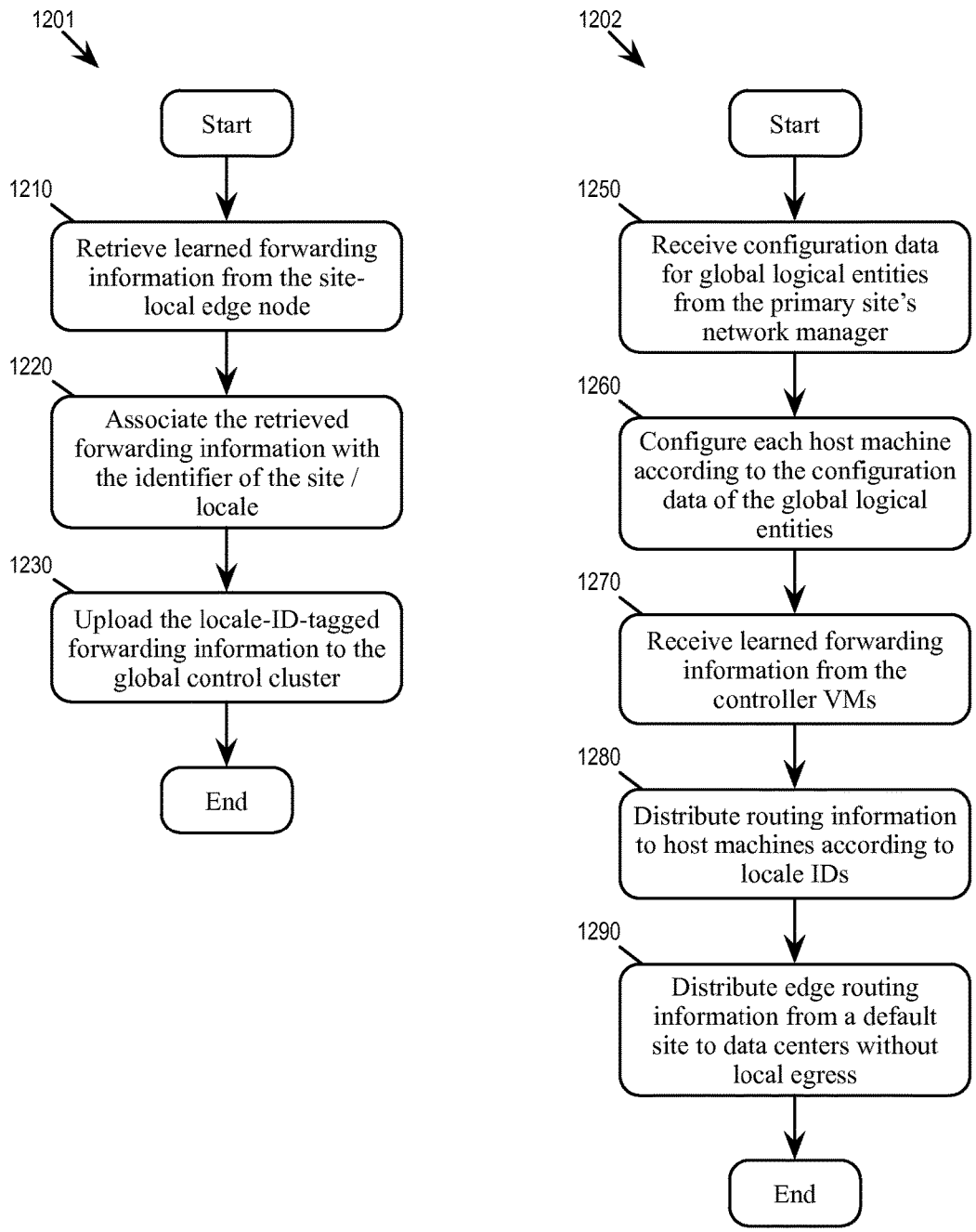
FIG. 12 conceptually illustrates processes that are performed in a multi-site environment for collecting and distributing routing information.

FIG. 12 conceptually illustrates processes 1201 and 1202 that are performed in a multi-site environment for collecting and distributing routing information. These processes are performed by the global control cluster for configuring the host machines implementing the global logical switches and routers according to the collected routing information.

The process 1201 starts when the control VM of a datacenter detects that the edge router has learned new routing information (e.g., from BGP exchanges). The process retrieves (at 1210) the forwarding or routing information that are learned by site-local edge nodes (e.g., the control VM 1051 retrieving the learned routing formation 1041 from the edge router 1031 of the datacenter 1001.) The process then associates (at 1220) the retrieved forwarding/routing information with the locale ID of the site (e.g., by tagging the retrieved information) Next the process uploads (at 1230) the learned routing information with the associated locale ID to the global control cluster. The process 1201 then ends. In some embodiments, when a control VM fails, another control VM would take over the task of reporting routes to the global control cluster.

The process 1202 starts when the global control cluster is initially brought on-line. The process receives (1250) configuration data for the global logical entities. In some embodiments, this configuration data is generated by a network manager of a "primary" datacenter. In some embodiments, one of the datacenters in a multi-site environment is designated as the primary site, and its network manager is responsible for provisioning the global logical entities across all datacenters of the multi-site environment. The provisioning of global logical entities/networks will be further described below in Section III. Next, the process configures (at 1260) each host machine in each of the data enters according to the received configuration data of the global logical entities. In some embodiments, operations 1250 and 1260 are performed only when the primary site's network manager is provisioning the global logical entities.

Next, the process receives (at 1270) reports of forwarding/routing information from the control VMs of datacenters. In some embodiments, such forwarding information are tagged with locale IDs of datacenters. The process then distributes (at 1280) the information to each host machine in each datacenter according to the locale IDs. In some embodiments, to host machines of a particular datacenter, the process distributes only routing information that is relevant to the particular datacenter, e.g., routing information tagged with the particular datacenter's locale ID. The process then distributes (at 1290) edge routing information from a default site to host machines in datacenters without their own local egress edge router. The process 1202 then ends.

III. Provisioning Global Logical Entities

In some embodiments, network managers of datacenters provision logical entities such as logical routers and logical switches. A network manager of a datacenter, upon receiving specification of logical network entities (logical switches, logical routers), generates a set of configuration data for configuring the host machines of the datacenter for the purpose of implementing the logical network entities. In the case of global logical entities that span multiple datacenters in a multi-site environment, one of the datacenters is designated or configured as the primary datacenter or primary site in some embodiments. The network manager of the primary site (referred to as the primary network manager) is responsible for providing the specification for provisioning the global logical entities in all datacenters of the multi-site environment. Each network manager of a site (primary or secondary) in turn uses the specification to generate configuration data for configuring the computing devices of its site to implement the global logical entities. The generated configuration data is also provided to the global control cluster so the global control cluster can control the global logical entities in each of the sites. This ensures that the provisioning and configuration of global logical entities is uniformly specified and synchronized.

Figure 13:
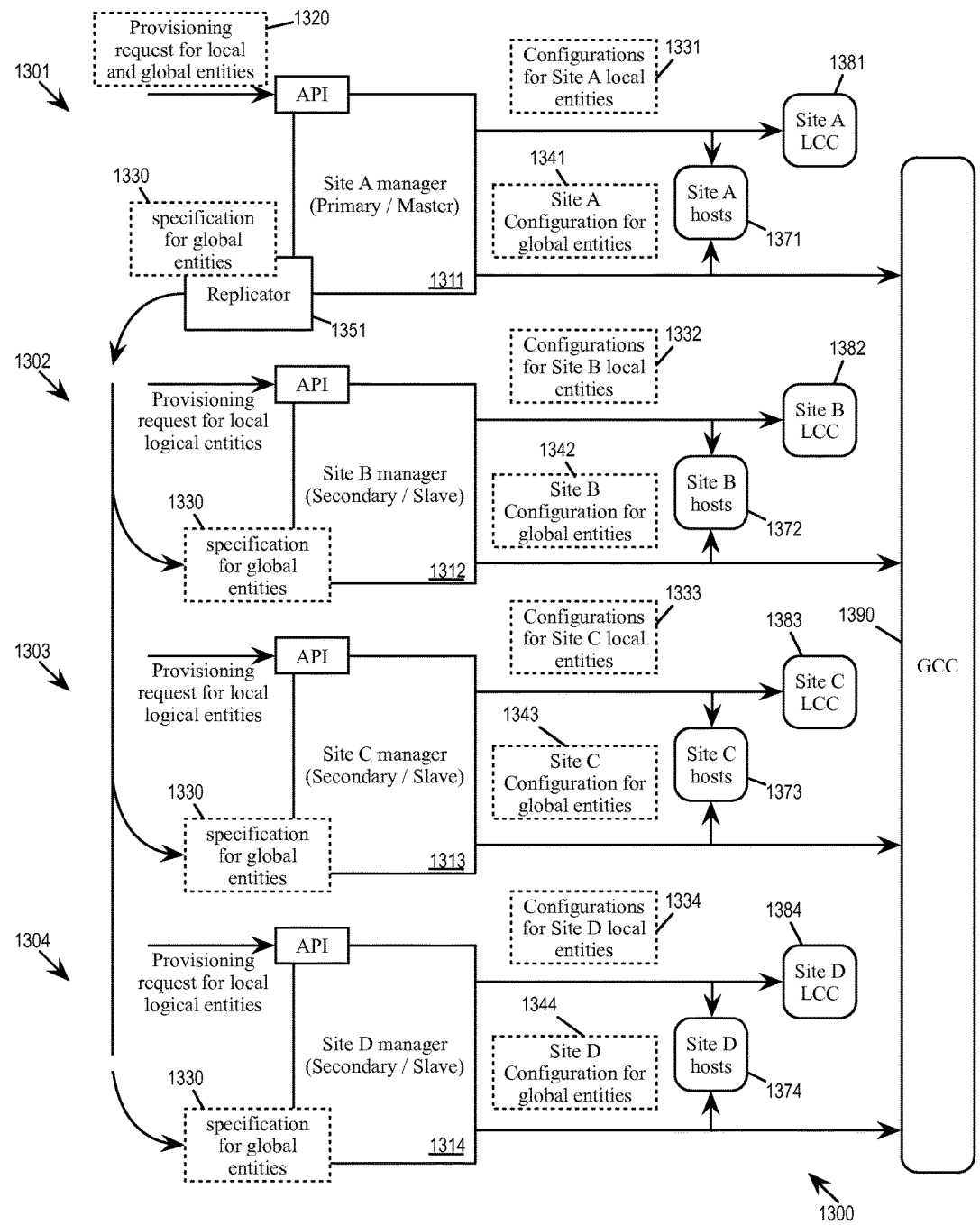
FIG. 13 illustrates a multi-site environment in which the network manager of a primary site generates configuration data for provisioning global logical entities across all datacenters of the multi-site environment.

FIG. 13 illustrates a multi-site environment 1300 in which the network manager of a primary site generates configuration data for provisioning global logical entities across all datacenters of the multi-site environment. The multi-site environment includes datacenters 1301-1304 (sites A, B, C, and D). Each of these datacenter has a corresponding network manager (network managers 1311-1314 for datacenters 1301-1304, respectively). In some embodiments, the network manager of a datacenter is implemented as VMs in host machines of the datacenter. Each network manager provides interfaces (e.g., application programming interface or API) for network administrators to enter specifications for logical networks and logical entities.

In the example of FIG. 13, the datacenter 1301 (site A) is configured as the primary site, while other datacenters (1302-1304) are secondary sites. The primary site's network manager 1311 is then the primary network manager responsible for generating configuration data 1330 for the global logical entities in the multi-site environment 1300. Once the primary network manager 1311 generates a specification 1330 for global entities, a replicator mechanism 1351 in the primary site 1301 then replicates the global specification 1330 to the secondary sites (1302-1304) so the network manager of each site has the identical specification for the global logical entities. In some embodiments, the specification 1330 for global entities is based on a set of provisioning requests or commands 1320 that are received by the primary network manager 1311. The provisioning command 1320 may include provisioning requests for local entities of the primary site (site A) in addition to global entities. The primary manager creates specifications of the global entities and local entities based on the provisioning commands, and the replicator mechanism 1351 identifies the specifications of the global entities (1330) and replicates it to other sites (B, C, and D).

The network manager of each site in turn processes the global specification 1330 into each site's own global configuration data (i.e., global configuration data 1341-1344 for site A, B, C, and D respectively). In some embodiments, each site's network manager generates the site's global configuration data based on the computing and network resources (i.e., host machines) available on the site. The site-specific global configuration data is then delivered to the site's host machines for provisioning the global logical entities. As a result, the global logical entities are provisioned across all four datacenters 1301-1304 of the multisite environment. Each site also provides its site-specific configuration data (1341-1344 respectively for sites A, B, C, and D) to the global control cluster 1390 of the multi-site environment.

In addition to provisioning global logical entities for global logical networks, the network manager of each datacenter also generates the (local) configuration data for provisioning the local logical entities of the datacenter. The local configuration data of a datacenter is used to configure the host machines of the datacenter and the local control cluster of the datacenter. As illustrated, the network manager 1311 generates local configuration data 1331 for host machines 1371 of site A, the network manager 1312 generates local configuration data 1332 for host machines of site B 1372, the network manager 1313 generates local configuration data 1333 for host machines of site C 1373, and the network manager 1314 generates local configuration data 1334 for host machines of site D 1374.

As mentioned by reference to FIG. 8*a* above, in some embodiments, the local control cluster of a site controls the local logical entities of that site, and the configuration data for local logical entities of the site is provided to the local control cluster. As illustrated in FIG. 13, the configuration data of local logical entities of each site is also delivered to the local control cluster of the site (i.e., site A local configuration data 1331 is provided to site A LCC 1381, site B local configuration data 1332 is provided to site B LCC 1382, etc.)

On the other hand, in some embodiments as described above by reference to FIG. 8*b* above, the global control cluster controls all of the local logical entities of all sites (in addition to controlling the global logical entities). In some of these embodiments, the configuration data of local logical entities of each site is delivered to the global control cluster (i.e., site A-D local configuration data 1331-1334 are all provided to the GCC 1390.)

As mentioned in Section I above, some embodiments allocate a global pool of VNIs for global logical switches, while each datacenter allocate its own pool of VNIs for local logical switches. (Likewise for global pool of DLRIs for global logical routers and local pools of DLRIs for local logical routers).

In order to ensure uniqueness of the VNIs (and DLRIs) within each of the datacenters (and at each host machine), a local pool of VNIs does not overlap the global pool of VNIs. Likewise a local pool of DLRIs does not overlap the global pool of DLRIs. In order to ensure this, the primary network manager decides on a global pool of VNI for the global logical entities. This global pool of VNIs is replicated to the secondary network managers (by e.g., the replicator 1351), each of which in turn decides on a local pool of VNIs for its local logical switches that does not overlap the local pool of VNIs for global logical switches. However, the local pools of VNIs between different sites may overlap. The same is true for global and local pools of DLRIs.

Figure 14:
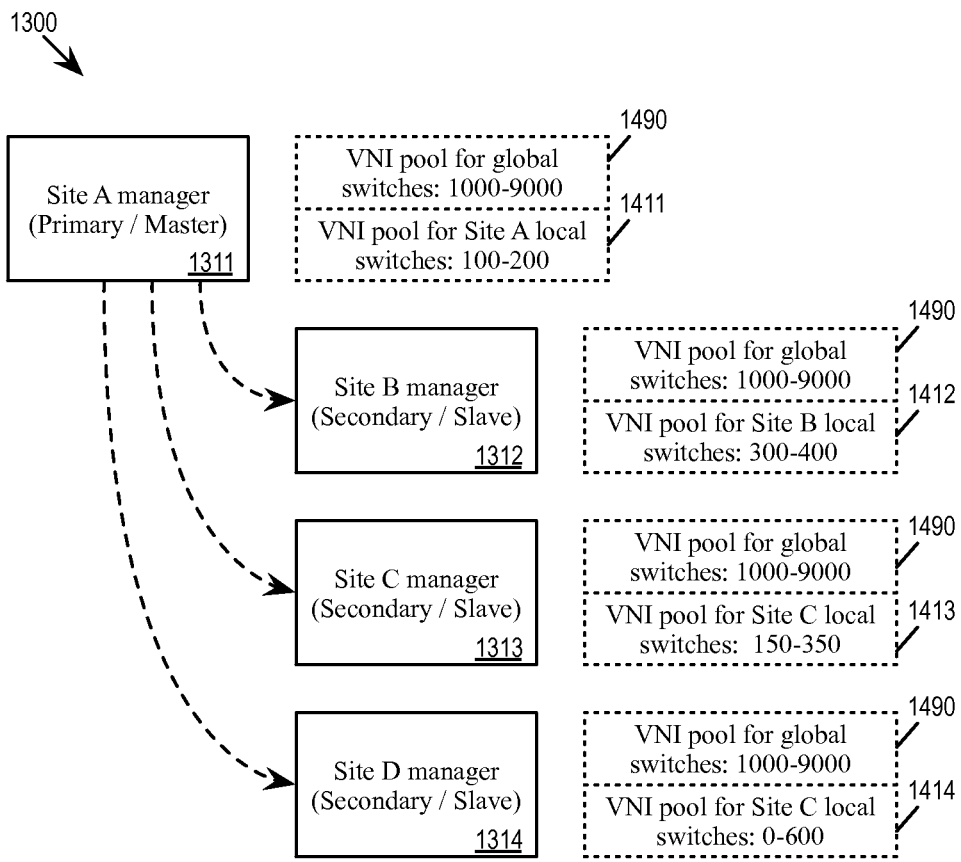
FIG. 14 conceptually illustrates a sequence of allocating VNI pools for global logical switches and for local logical switches.

FIG. 14 conceptually illustrates a sequence of allocating VNI pools for global logical switches and for local logical switches. Though this figure does not illustrate DLRI pools for local routers and global routers, one of ordinary skill would understand that the example illustrated in the figure applies analogously to DLRI pools.

The network manager 1311 of the primary site (site A 1301) allocates a global pool 1490 of VNIs for global logical entities (VNIs in range of 1000-9000). This allocation of VNIs is replicated/forwarded to the network managers 1312-1314 of the secondary sites (site B 1302, site C 1303, and site D 1304). Upon knowing the VNIs that are assigned to the global pool, the network manager 1312 of site B in turn allocate a local pool 1412 of VNIs for its local logical entities (VNIs in range of 300-400) that does not overlap the global pool. Likewise the network managers of 1313 and 1314 of sites C and D also each decides on a local pool (1413 and 1414) of VNIs for its local logical entities that does not overlap the global pool. In the meantime, the network manager 1311 also decides on a local pool 1411 of VNIs for its own datacenter (site A). These local pools in some embodiments may overlap other, since the local logical entities are controlled by each site's own local control cluster.

As mentioned, in some embodiments, the same global control cluster controls all logical entities, whether local or global, across all sites of the multi-site environment. Some embodiments ensure each logical entity is uniquely addressable by the global control cluster by assigning each a unique VNI (for logical switches) or DLRI (for logical routers). In some embodiments, this is accomplished by having the primary manager allocating unique, non-overlapping pools of VNIs DLRIs. Specifically, the pool of VNIs for the global logical switches does not over lap the pool of VNIs for logical switches of any site, and the pools of VNIs for logical switches of different site do not overlap each other. (Likewise for global pool of DLRIs and local pools of DLRIs.)

Figure 15:
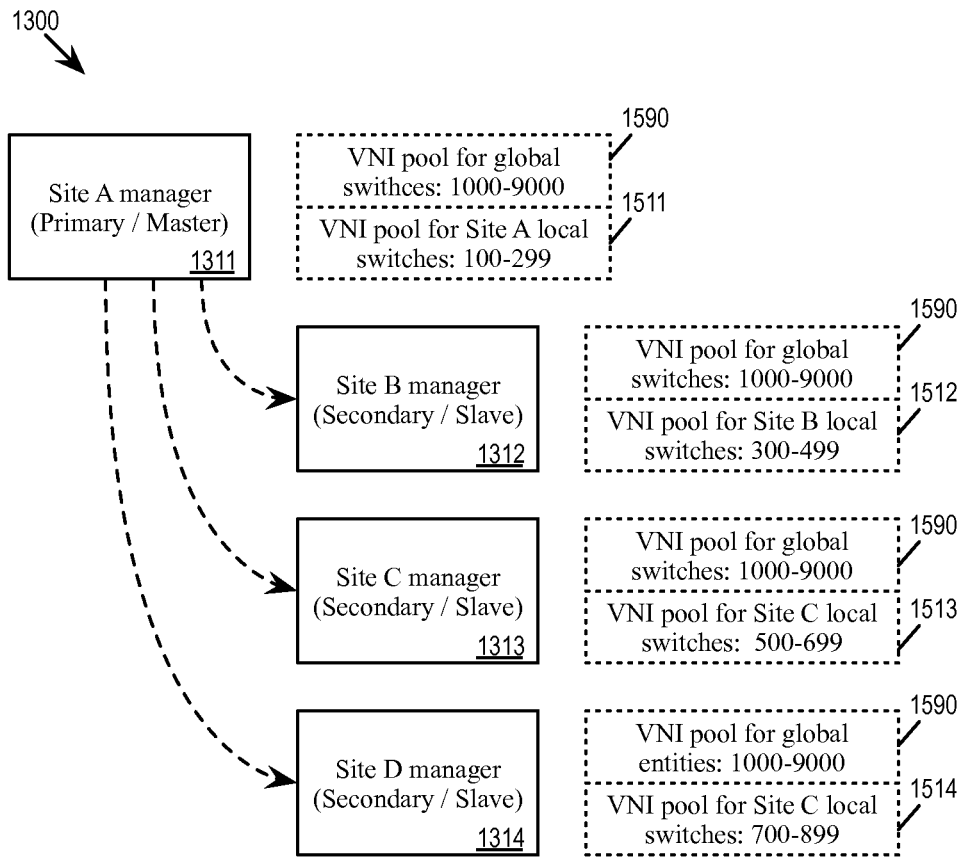
FIG. 15 illustrates the assignment of VNI pools for logical switches when the global control cluster controls all global and local logical entities.

FIG. 15 illustrates the assignment of VNI pools for logical switches when the global control cluster controls all global and local logical entities. Though this figure does not illustrate DLRI pools for local routers and global routers, one of ordinary skill would understand that the example illustrated in the figure applies analogously to DLRI pools.

As illustrated, the network manager 1311 of the primary site (site A 1301) allocates a global pool 1590 of VNIs for global logical entities (VNIs in range of 1000-9000). This allocation of VNIs is replicated/forwarded to the network managers 1312-1314 of the secondary sites (site B 1302, site C 1303, and site D 1304). Furthermore, the primary manager 1311 also allocate a unique VNI pool of local logical switches for each site (VNI pools 1511-1514 for sites A-D respectively). As illustrated, the VNI pool for global switches 1590 do not overlap any of the VNI pools of the local switches 1511-1514, and the VNI pools of the local switches 1511-1514 do not overlap each other.

Figure 16:
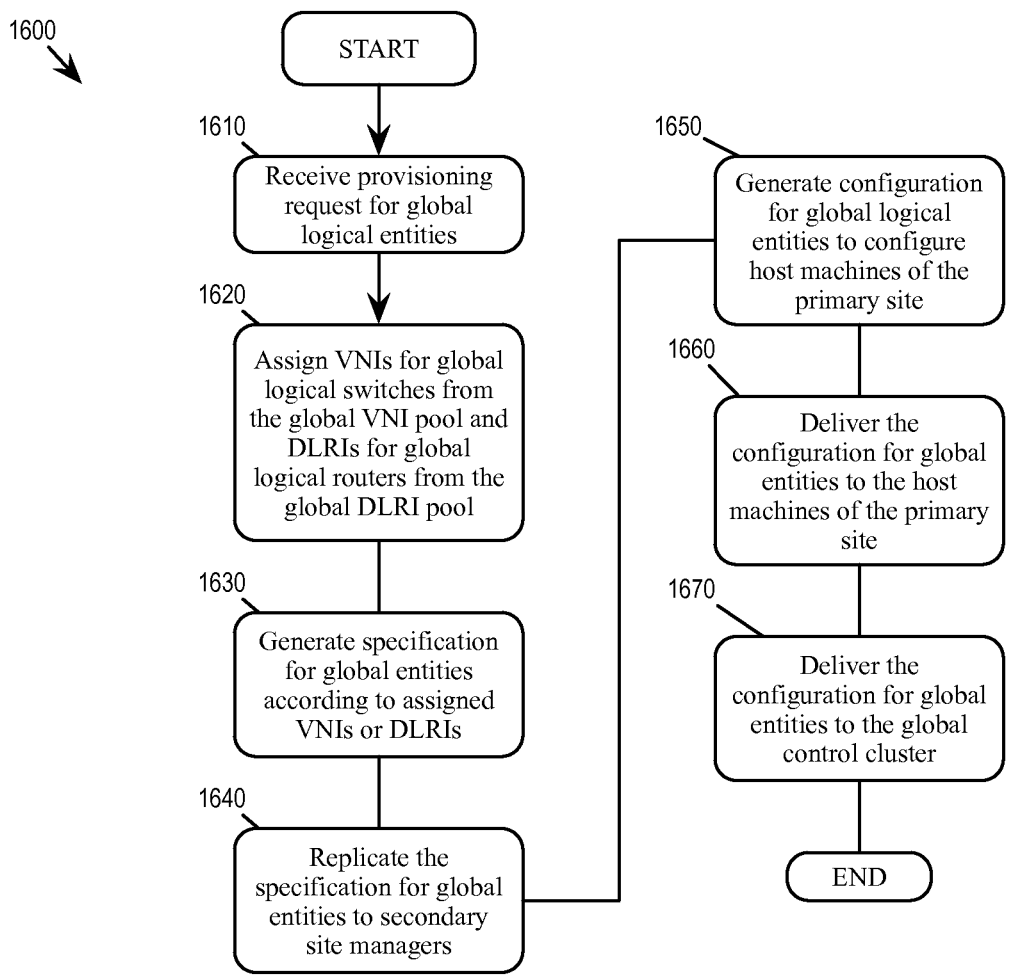
FIG. 16 conceptually illustrates processes performed by the network manager of the primary site when the multi-site environment is provisioning global logical entities.

FIG. 16 conceptually illustrates processes 1600 performed by the network manager of the primary site when the multi-site environment is provisioning global logical entities. The process 1600 starts when it receives (at 1610) a provisioning request or command from the user or network administrator for creating global logical entities (switches and/or routers). The process then assigns (1620) VNIs for global logical switches from the global VNI pool and/or DLRIs for global logical routers from the global DLRI pool. The allocation of such pools is described above by reference to FIGS. 14 and 15. The process then generates (at 1630) specification for global logical entities according to the assigned VNIs and/or DLRIs. The process also replicates (at 1640) the generated specification for logical entities to secondary site managers.

Next, the process generates (at 1650) configuration data for configuring the host machines of the primary site to implement the global logical entities based on the specification of global logical entities. In order to implement the global logical entities locally at the primary site, some embodiments specify the configuration of local resources of the primary site (computing, networking, and routing, etc.) to implement the required features of the global logical entities.

The process then delivers (at 1660) the configuration data to the host machines of the primary site. In order to enable the global control cluster to control the global logical entities implemented by the host machines of the primary site, the process also delivers (at 1670) the configuration data of global entities to the global control cluster. The process 1600 then ends.

Figure 17:
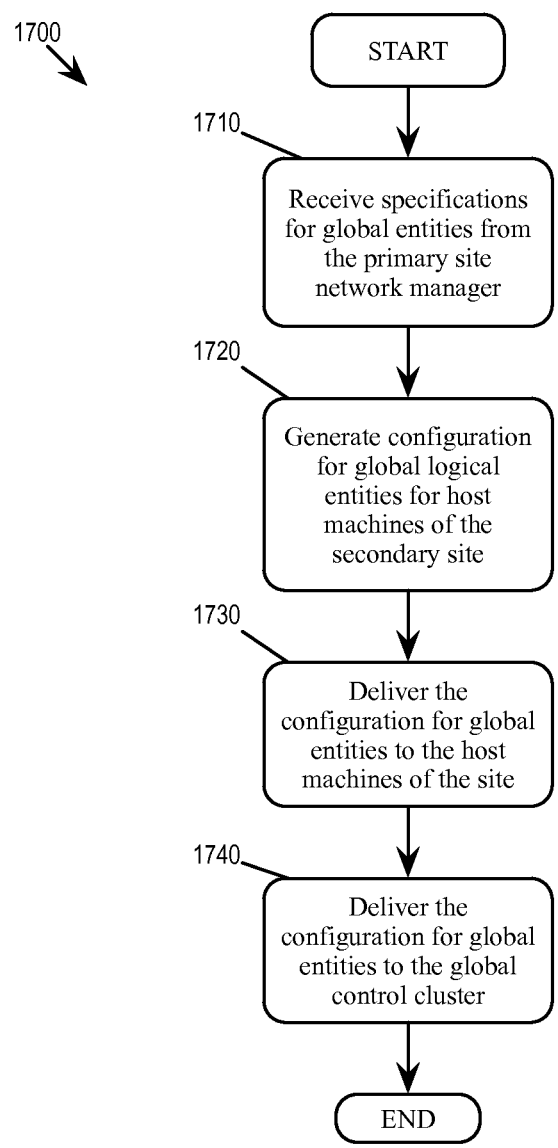
FIG. 17 conceptually illustrates a process performed by network managers of secondary sites when provisioning global logical entities.

FIG. 17 conceptually illustrates a process 1700 performed by network managers of secondary sites when provisioning global logical entities. The process receives (at 1710) specification for global logical entities (e.g., 1330) from the primary site network manager.

Based on the received specification for global logical entities, the process generates (at 1720) configuration data for configuring the host machines of the secondary site to implement the global logical entities. In order to implement the global logical entities locally at the secondary site, some embodiments specify the configuration of local resources of the secondary site (computing, networking, and routing, etc.) to implement the required features of the global logical entities.

Next, the process delivers (at 1730) the generated configuration data for global logical entities to the host machines of the secondary site. In order to enable the global control cluster to control the global logical entities implemented by the host machines of the secondary site, the process also delivers (at 1740) the configuration data of global entities to the global control cluster. The process 1700 then ends.

Figure 18:
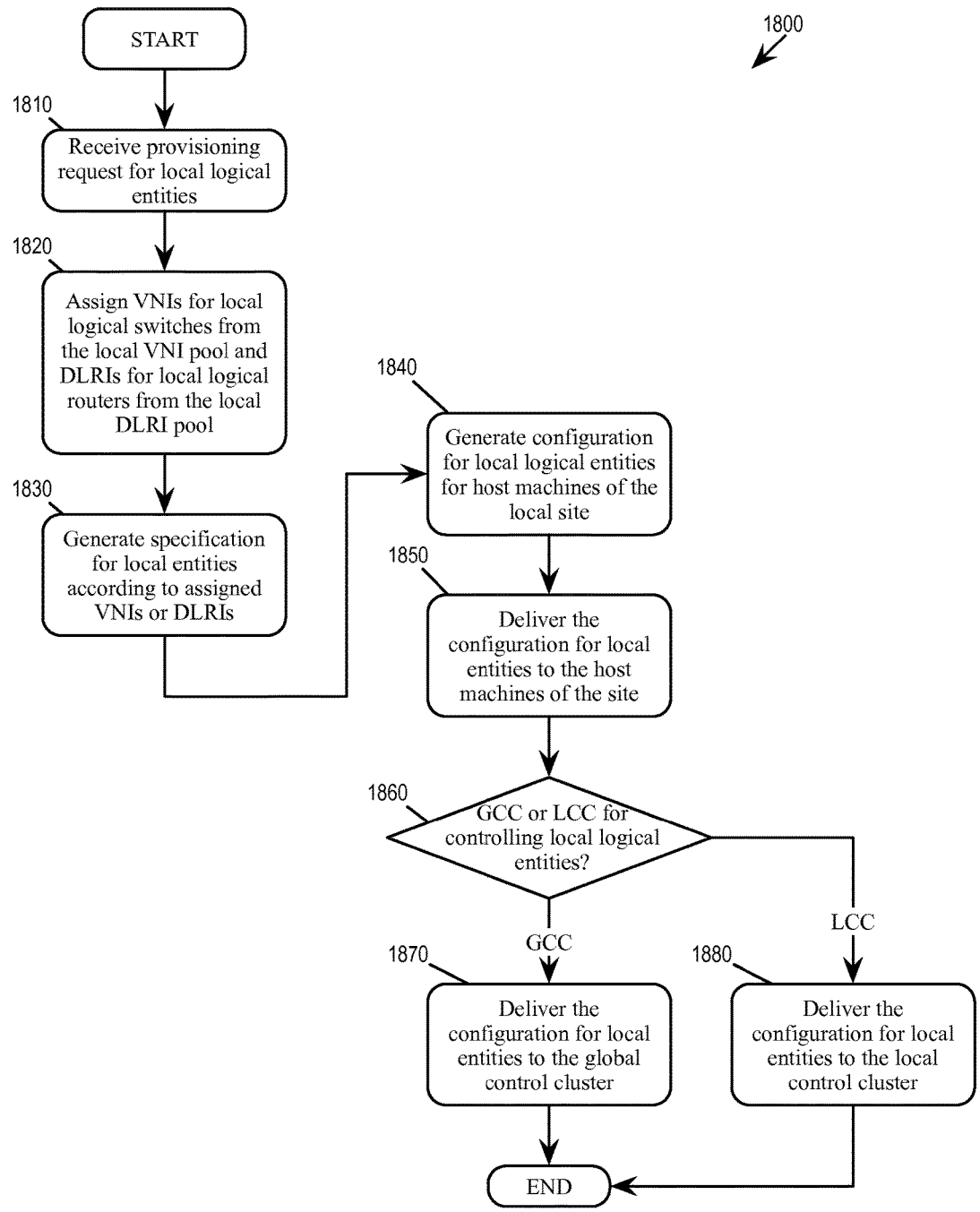
FIG. 18 conceptually illustrates a process for provisioning local logical entities.

In addition to provisioning global logical entities, the primary site manager and the secondary site managers also perform provisioning of local logical entities. FIG. 18 conceptually illustrates a process 1800 for provisioning local logical entities. This process can be performed by either the primary site's manager or a secondary site's manager.

The process starts when it receives (at 1810) provisioning request or command from the user or network administrator for creating logical entities (switches and/or routers) that are local to the site. The process then assigns (at 1820) VNIs for global logical switches from the local VNI pool and/or local DLRIs pool for local logical entities. The allocation of such pools is described above by reference to FIGS. 14 and 15. The process then generates (at 1830) specification for local logical entities according to the assigned VNIs and/or DLRIs.

Next, the process generates (at 1840) configuration data for configuring the host machines of the site to implement the local logical entities based on the specification of local logical entities. The process then delivers (at 1850) the configuration data to the host machines of the site.

The process then determines (at 1860) whether the local logical entities are controlled by the local control cluster (LCC) of the site, or by the global control cluster (GCC) of the entire multi-site environment. In order to enable the control of the local logical entities, some embodiments provide the configuration of the local logical entities to a control cluster. If the control of the local logical entities is handled by the GCC of the multi-site environment, the process delivers (at 1870) the configuration data of the local logical entities to the GCC. If the control of the local logical entities is handled by the LCC of the site, the process delivers (at 1880) the configuration for local logical entities to the site's LCC. The process 1800 then ends.

IV. Error Recovery

Much of the data plane and control plane traffic of a multi-site environment relies on inter-site transport mechanism. The exchange of data packet by a global logical switch relies on inter-site transport. The control of global logical entities by global control cluster and the provisioning of the global logical entities all rely on inter-site transport as well. In some embodiments, the inter-site transport relies on tunneling across external physical networks such as the Internet and can be less reliable. The provisioning of global logical entities is particularly vulnerable to errors in inter-site data exchange, because global logical entities can function only if all of the datacenters in the multi-site environment are properly synchronized. Some embodiments therefore provide a more robust mechanism for configuration data transmission.

In some embodiments, when the primary site's network manager sends (replicates) configuration data or specification of global logical entities to the secondary sites' network managers, the primary site's network manager sends the configuration data or specification as a series of transactions, each transaction is associated with a transaction identifier. In some embodiments, each transaction is associated with a global logical entity (i.e., for delivering the specification of a particular global logical router or switch). After the specification has been transmitted, the receiving secondary site's network manager uses the transaction IDs to report to the primary site's network manager as to which configuration transactions were successfully completed. The primary site's network manager in turn uses the reported transaction IDs to identify the transaction that have failed so it can re-transmit those failed transactions.

Figure 19:
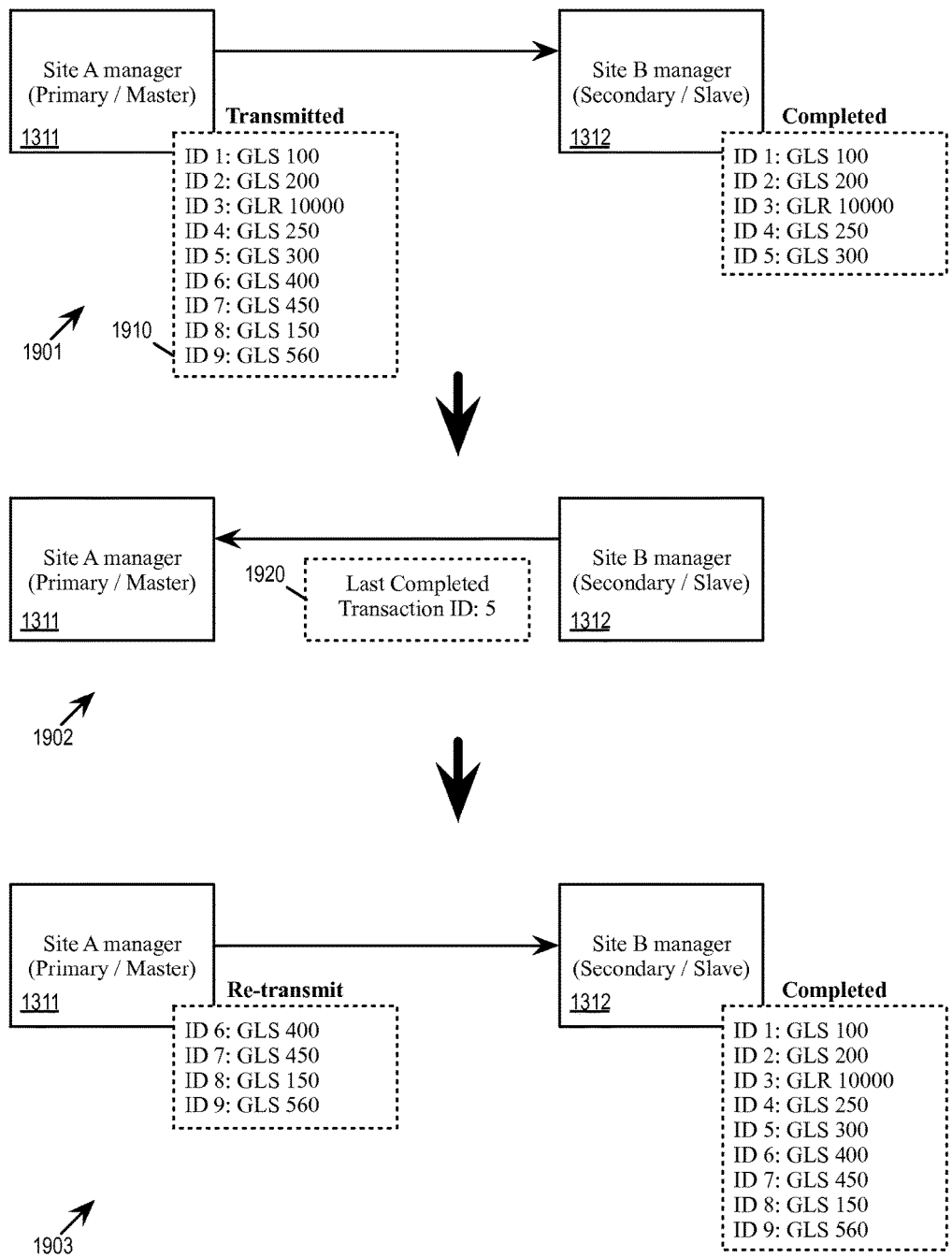
FIG. 19 illustrates the use of transaction IDs for error recovery during provisioning of global logical entities.

FIG. 19 illustrates the use of transaction IDs for error recovery during provisioning of global logical entities. As illustrated, the network manager 1311 of site A (the primary site) generates a set of configuration data 1910 for several global logical entities. The network manager then transmits the configuration data 1910 to the network manager 1312 of site B (a secondary site) in a series of transactions. Each transaction is associated with a transaction ID, and each transaction is for configuring or provisioning one global logical entity (either GLS or GLR). The figure illustrates the error recovery process by transaction ID in three stages 1901-1903.

At the first stage 1901, site A's network manager 1311 sends out nine configuration transactions to site B's network manager 1312. The transmitted configuration transactions are labeled with transaction IDs 1 through 9. However, only five of the transactions were successfully completed, i.e., those with transaction IDs 1 through 5.

At the second stage 1902, site B's network manager 1312 sends a reporting message 1920 back to the site A's manager 1311 as to which transactions were successfully completed. In some embodiments, the reporting secondary site manager reports the IDs of all successfully completed transactions. In some embodiments, the secondary site manager only needs to report the transaction ID of the last successfully completed transaction, and the primary site's manager is able to infer that all previous transactions were successful, and all subsequent transactions have failed. In the example illustrated in FIG. 19, site B's manager reports only the transaction ID of the last successful transaction, namely "5".

At the third and final stage 1903, the site A manager has determined that transactions with IDs 6-9 have failed, since the ID of last successful configuration transaction ID is "5". Site A's network manager 1311 therefore retransmits transactions with IDs 6-9 to the Site B's network manager. The retransmitted transactions were successful, and Site B has successfully provisioned all global logical entities with transaction IDs from 1 through 9.

Since the operations of the global logical networks in a multi-site environment is centrally controlled by the network manager of the primary site, the failure of the primary site would cause the global logical networks to fail across all datacenters of the multi-site environment, even when the secondary sites are still functioning properly. Some embodiments therefore provide for one of the secondary sites to take over the control and provisioning of global logical entities when the primary site fails.

Figure 20:
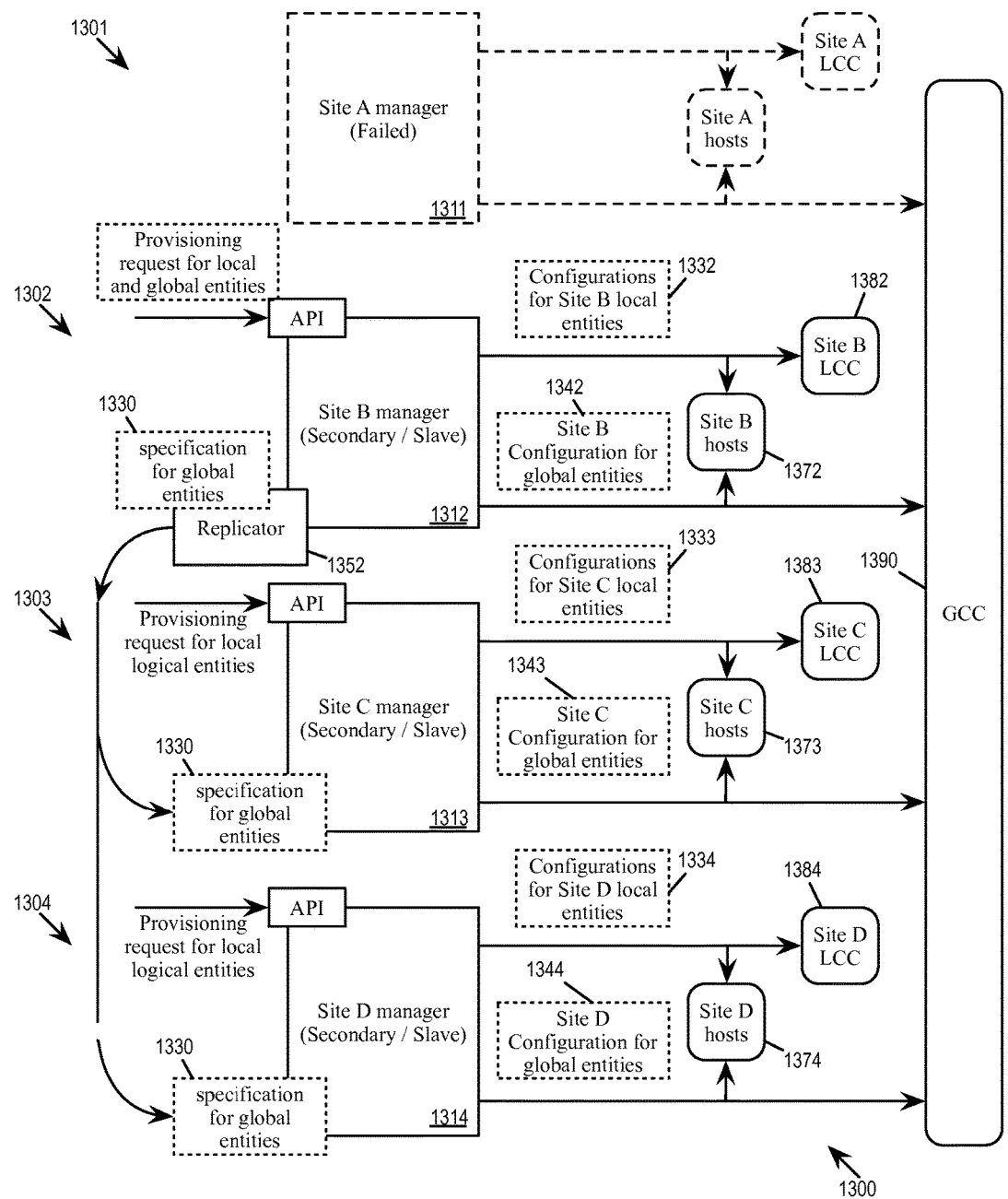
FIG. 20 illustrates the recovery of global logical networks when the primary site fails.

FIG. 20 illustrates the recovery of global logical networks when the primary site fails. The figure illustrates the multi-site environment 1300 when the network manager 1311 of site A (the primary site) has failed. Consequently, the primary site can no longer control the global control cluster or produce any configuration data/specification for provisioning global logical entities.

As illustrated, the network manager 1312 of site B has been configured to take over as the primary network manager. The network manager 1312 now accepts provisioning requests for global logical networks and produce specifications for global logical entities. This new primary network manager 1312 takes over the task of controlling and configuring the global control cluster 1390. When generating configuration data for global logical entities, it uses its own replicator 1352 to replicate the global configuration data to the network managers (1313 and 1314) or other sites.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
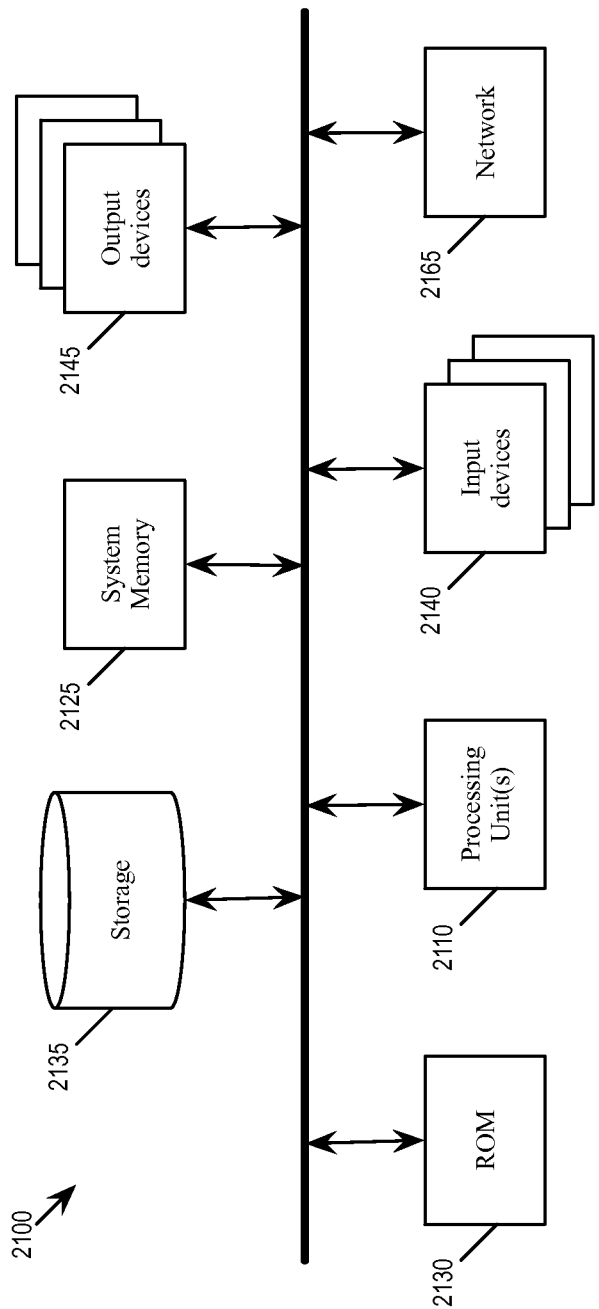
FIG. 21 conceptually illustrates an electronic system with which some embodiments of the invention are implemented.

FIG. 21 conceptually illustrates an electronic system 2100 with which some embodiments of the invention are implemented. The electronic system 2100 can be used to execute any of the control, virtualization, or operating system applications described above. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieves instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieves instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 12, 16, 17, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
    at a first network manager of a first datacenter:
        receiving a first specification for a global logical entity from a second network manager of a second datacenter;
        generating a first configuration for provisioning the global logical entity in the first datacenter based on the received specification and resources of the first datacenter;
        transmitting the first configuration to a global control cluster that controls both the first datacenter and the second datacenter;
        receiving a second specification for a local logical entity that is to be implemented in only the first datacenter,
        generating a second configuration for provisioning the local logical entity in the first datacenter based on the resources of the first datacenter; and
        transmitting the second configuration to a local control cluster of the first datacenter.

2. The method of claim 1, wherein each received specification comprises a plurality of transactions, each transaction associated with a transaction identifier.

3. The method of claim 2, wherein the first network manager fails to perform a subset of the plurality of transactions, wherein the second network manager uses the transaction identifiers to identify the subset of the plurality of transactions that the first network manager fails to perform.

4. The method of claim 3 further comprising using the transaction identifier of the last successfully performed transaction to identify the subset of the plurality of transactions that the first network manager fails to perform.

5. The method of claim 4 further comprising re-receiving the subset of the plurality of transactions from the second network manager.

6. The method of claim 1, wherein the global logical entity is a global logical router.

7. The method of claim 1, wherein the global logical entity is a global logical switch.

8. A non-transitory machine readable medium storing a program for execution by a set of processing units, the program comprising sets of instructions for:
    generating, at a first network manager of a first datacenter, a specification for a logical entity based on a provisioning request;
    generating a first configuration for provisioning the logical entity in the first datacenter based on the generated specification and resources of the first datacenter;
    upon determining that the logical entity is local to the first datacenter and does not span the first datacenter and a second datacenter, transmitting the first generated configuration to a local control cluster of the first datacenter for the local control cluster to implement the logical entity in host machines of the first datacenter; and
    upon determining that the logical entity spans the first datacenter and a second datacenter, transmitting the first generated configuration to a global control cluster that receives a second generated configuration from a second network manager of the second data center, the global control cluster controlling both the first datacenter and the second datacenter to implement the logical entity in host machines of the first and second datacenters.

9. The non-transitory machine readable medium of claim 8, wherein the program further comprises a set of instructions for, when the logical entity spans the first datacenter and a second datacenter, transmitting the generated specification to the second network manager for the network manager to use to generate the second configuration, wherein the generated specification comprises a plurality of transactions, each transaction associated with a transaction identifier.

10. The non-transitory machine readable medium of claim 9, wherein the second network manager fails to perform a subset of the plurality of transactions, wherein the program further comprises a set of instructions for using the transaction identifiers to identify the subset of the plurality of transactions that the second network manager fails to perform.

11. The non-transitory machine readable medium of claim 10 the program further comprising a set of instructions for using the transaction identifier of the last successfully performed transaction to identify the subset of the plurality of transactions that the second network manager fails to perform.

12. The non-transitory machine readable medium of claim 11 the program further comprising a set of instructions for re-transmitting the subset of the plurality of transactions to the second network manager.

13. The non-transitory machine readable medium of claim 8, wherein the logical entity is a logical router.

14. The non-transitory machine readable medium of claim 8, wherein the logical entity is a logical switch.

15. A method comprising:
 generating, at a first network manager of a first datacenter, a first specification for a first logical entity and a second specification for a second logical entity, wherein the first logical entity is a global logical entity that spans both the first datacenter and a second datacenter and the second logical entity is a local logical entity that is implemented in only the first datacenter;
 generating a configuration for provisioning the first and second logical entities in the first datacenter based on the first and second specifications and resources of the first datacenter; and
 for the first logical entity that is a global logical entity that spans the first and second datacenters:
  transmitting the generated configuration for provisioning the global first logical entity in the first datacenter to a global control cluster that controls global logical entities that span both the first datacenter and the second datacenter; and
  forwarding the first specification to a second network manager of the second datacenter for the second network manager to generate a configuration for provisioning the first logical entity in the second datacenter and to provide the generated configuration to the global control cluster.

16. The method of claim 15, wherein each generated specification comprises a plurality of transactions, each transaction associated with a transaction identifier.

17. The method of claim 16, wherein the second network manager fails to perform a subset of the plurality of transactions, wherein the first network manager uses the transaction identifiers to identify the subset of the plurality of transactions that the second network manager fails to perform.

18. The method of claim 17 further comprising using the transaction identifier of the last successfully performed transaction to identify the subset of the plurality of transactions that the second network manager fails to perform.

19. The method of claim 18 further comprising re-transmitting the subset of the plurality of transactions to the second network manager.

20. The method of claim 15, wherein the first logical entity is a global logical router.

21. The method of claim 15, wherein the first logical entity is a global logical switch.

* * * * *